United States Patent
Zhou et al.

(10) Patent No.: US 10,768,857 B2
(45) Date of Patent: Sep. 8, 2020

(54) STORAGE SYSTEM HAVING A CONTROLLER THAT SELECTS A DIE OF A SOLID STATE DISK TO STORE DATA

(71) Applicant: Huawei Technologies Co., Ltd., Shenzhen (CN)

(72) Inventors: Meng Zhou, Chengdu (CN); Kun Tang, Chengdu (CN); Jui-Yao Yang, Santa Clara, CA (US); Jea Woong Hyun, Santa Clara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 80 days.

(21) Appl. No.: 15/954,029

(22) Filed: Apr. 16, 2018

(65) Prior Publication Data

US 2018/0232181 A1 Aug. 16, 2018

Related U.S. Application Data

(63) Continuation of application No. PCT/CN2016/113088, filed on Dec. 29, 2016.

(51) Int. Cl.
*G06F 3/06* (2006.01)
*G06F 12/1009* (2016.01)
*G06F 12/02* (2006.01)

(52) U.S. Cl.
CPC .......... *G06F 3/0659* (2013.01); *G06F 3/0604* (2013.01); *G06F 3/064* (2013.01);
(Continued)

(58) Field of Classification Search
CPC .... G06F 3/0604; G06F 3/0611; G06F 3/0616; G06F 3/064; G06F 3/0659; G06F 3/0679;
(Continued)

(56) References Cited

U.S. PATENT DOCUMENTS 5,737,742 A * 4/1998 Achiwa ................ G06F 12/023
365/189.09
8,593,866 B2 11/2013 Hutchison et al.
(Continued)

FOREIGN PATENT DOCUMENTS

CN 1376980 A 10/2002
CN 102428453 A 4/2012
(Continued)

OTHER PUBLICATIONS

Machine Translation and Abstract of Japanese Publication No. JP2016524770, Aug. 18, 2016, 28 pages.
(Continued)

*Primary Examiner* — Larry T Mackall
(74) *Attorney, Agent, or Firm* — Conley Rose, P.C.

(57) ABSTRACT

A storage system, includes a controller and a solid state disk. The controller creates multiple segments in advance, selects a first die from the multiple dies, selects a first segment from the multiple segments, determines an available offset of the first segment, generates a write request, where the write request includes a write address, target data, and a data length of the target data, and the write address includes an identifier of a channel coupled to the first die, an identifier of the first die, an identifier of the first segment, and the available offset, and sends the write request to the solid state disk. The solid state disk receives the write request, and stores the target data according to the write address and the data length.

20 Claims, 6 Drawing Sheets

(52) U.S. Cl.
CPC .......... *G06F 3/0611* (2013.01); *G06F 3/0616* (2013.01); *G06F 3/0679* (2013.01); *G06F 3/0688* (2013.01); *G06F 12/0246* (2013.01); *G06F 12/1009* (2013.01); *G06F 2212/1036* (2013.01); *G06F 2212/1044* (2013.01); *G06F 2212/214* (2013.01); *G06F 2212/657* (2013.01); *G06F 2212/7201* (2013.01); *G06F 2212/7208* (2013.01); *G06F 2212/7211* (2013.01)

(58) Field of Classification Search
CPC .............. G06F 3/0688; G06F 12/0246; G06F 12/1009; G06F 2212/1036; G06F 2212/1044; G06F 2212/214; G06F 2212/657; G06F 2212/7201; G06F 2212/7208; G06F 2212/7211
See application file for complete search history.

(56) References Cited

U.S. PATENT DOCUMENTS

| | | | |
|---|---|---|---|
| 9,170,939 B1 | 10/2015 | Jones et al. | |
| 2002/0156988 A1 | 10/2002 | Toyama et al. | |
| 2004/0080985 A1* | 4/2004 | Chang ................ | G06F 12/0246 365/185.33 |
| 2008/0049520 A1* | 2/2008 | Kang .................... | G11C 16/10 365/185.33 |
| 2009/0235014 A1* | 9/2009 | Yim .................... | G06F 12/0868 711/103 |
| 2009/0327602 A1* | 12/2009 | Moore ................ | G06F 3/0616 711/114 |
| 2010/0262762 A1 | 10/2010 | Borchers et al. | |
| 2010/0262773 A1* | 10/2010 | Borchers ............... | G06F 3/0613 711/114 |
| 2010/0287353 A1* | 11/2010 | Khmelnitsky ....... | G06F 12/0246 711/170 |
| 2011/0208896 A1* | 8/2011 | Wakrat ................ | G06F 12/0246 711/103 |
| 2012/0239851 A1* | 9/2012 | Calvert ............... | G06F 11/1441 711/103 |
| 2015/0095546 A1 | 4/2015 | Bennett et al. | |
| 2016/0092116 A1 | 3/2016 | Liu et al. | |
| 2016/0110107 A1 | 4/2016 | Zhang et al. | |
| 2016/0188206 A1 | 6/2016 | Sinclair | |
| 2017/0003896 A1 | 1/2017 | Seppanen | |
| 2017/0075620 A1 | 3/2017 | Yamamoto et al. | |

FOREIGN PATENT DOCUMENTS

| | | |
|---|---|---|
| CN | 102428455 A | 4/2012 |
| CN | 103218270 A | 7/2013 |
| CN | 102567257 B | 8/2014 |
| CN | 104090847 A | 10/2014 |
| CN | 104461393 A | 3/2015 |
| CN | 105653202 A | 6/2016 |
| CN | 105745628 A | 7/2016 |
| JP | 2007280431 A | 10/2007 |
| JP | 2016524770 A | 8/2016 |
| WO | 2015162758 A1 | 10/2015 |

OTHER PUBLICATIONS

Foreign Communication From a Counterpart Application, Japanese Application No. 2018-522781, Japanese Office Action dated Jul. 12, 2019, 3 pages.
Foreign Communication From a Counterpart Application, Japanese Application No. 2018-522781, English Translation of Japanese Office Action dated Jul. 12, 2019, 4 pages.
Machine Translation and Abstract of Chinese Publication No. CN102567257, Jul. 11, 2012, 9 pages.
Machine Translation and Abstract of Chinese Publication No. CN104090847, Oct. 8, 2014, 17 pages.
Foreign Communication From a Counterpart Application, European Application No. 16915920.9, Extended European Search Report dated Mar. 8, 2019, 14 pages.
Machine Translation and Abstract of Chinese Publication No. CN103218270, Jul. 24, 2013, 28 pages.
Machine Translation and Abstract of Chinese Publication No. CN104461393, Mar. 25, 2015, 30 pages.
Foreign Communication From a Counterpart Application, PCT Application No. PCT/CN2016/113088, International Search Report dated Sep. 28, 2017, 8 pages.
Foreign Communication From a Counterpart Application, PCT Application No. PCT/CN2016/113088, Written Opinion dated Sep. 28, 2017, 5 pages.
Foreign Communication From a Counterpart Application, European Application No. 16915920.9, Extended European Search Report dated Nov. 29, 2018, 14 pages.
Machine Translation and Abstract of Chinese Publication No. CN102428455, Apr. 25, 2012, 29 pages.
Machine Translation and Abstract of Chinese Publication No. CN1376980, Oct. 30, 2002, 27 pages.
Machine Translation and Abstract of Chinese Publication No. CN105745628, Jul. 6, 2016, 19 pages.
Foreign Communication From a Counterpart Application, Chinese Application No. 201680003654.7, Chinese Office Action dated Jan. 15, 2020, 17 pages.
Foreign Communication From a Counterpart Application, European Application No. 16915920.9, Partial Supplementary European Search Report dated Nov. 29, 2018, 14 pages.

* cited by examiner

STORAGE SYSTEM HAVING A CONTROLLER THAT SELECTS A DIE OF A SOLID STATE DISK TO STORE DATA

CROSS-REFERENCE TO RELATED APPLICATIONS

This application is a continuation of International Patent Application No. PCT/CN2016/113088, filed on Dec. 29, 2016, which is hereby incorporated by reference in its entirety.

TECHNICAL FIELD

This application relates to the field of storage technologies, and in particular, to a storage system and a solid state disk.

BACKGROUND

A flash array is a storage system including a solid state disk and a controller. The controller manages storage space of the solid state disk in a form of a segment. A segment is an area with a segment of consecutive logical block addresses allocated by the controller, and the segment may be mapped to a segment of consecutive logical block addresses on the solid state disk. After receiving a write request from a host, the controller allocates a segment to the write request, generates a new write request based on the allocated segment, where the new write request carries to-be-written data and a logical block address that is of the solid state disk corresponding to the allocated segment, and then sends the new write request to the solid state disk. After receiving the new write request from the controller, the solid state disk selects a physical storage resource based on a policy of the solid state disk, writes the data carried in the new write request to the physical storage resource, and then records the mapping relationship between the logical block address of the solid state disk and the physical storage resource, and the recorded mapping relationship is used as a basis for subsequent data queries.

Because the process of selecting the physical storage resource by the solid state disk is totally based on the policy of the solid state disk and is transparent to the controller, a problem that the controller cannot effectively use the storage space of the solid state disk may occur.

SUMMARY

Embodiments of the present disclosure provide provides a storage system and a solid state disk to use storage space of the solid state disk more effectively and properly.

According to a first aspect, an embodiment of the present disclosure provides a storage system, wherein the storage system includes a controller and a solid state disk, the controller is capable of communicating with the solid state disk, the solid state disk includes multiple channels, and each of the multiple channels is connected to multiple dies, where the controller is configured to create multiple segments in advance, select a first die from the multiple dies, select a first segment from the multiple segments, determine an available offset of the first segment, generate a write request, where the write request includes a write address, target data, and a data length of the target data, the write address includes an identifier of a channel connected to the first die, an identifier of the first die, an identifier of the first segment, and the available offset, and the target data is data to be written to the solid state disk, and send the write request to the solid state disk, and the solid state disk is configured to receive the write request, and store the target data according to the write address and the data length of the target data.

In this embodiment of the present disclosure, before selecting the first die, the controller receives one or more host write requests from a host, where each host write request carries a host logical block address, data, and a data length, and the host logical block address is a start logical address for writing the data by the host, the data is data to be written to the storage system, and the data length is used to identify a length of the data. The controller may cache the data, and may further perform, using a capacity of a page of the solid state disk as a unit, a splitting and/or combining operation on the data carried in the host write request to generate multiple unit-length data blocks. The controller may perform the step of selecting the first die immediately after receiving the host write request, or may start performing the step of selecting the first die when a first condition is met. The first condition may be that the data length of the cached data is greater than a specified threshold, or may be that the controller enters a new data write cycle.

Before selecting the first die, the controller may further first determine the target data to be written to the solid state disk and the data length of the target data. The target data may be all or a part of the data carried in the received one or more host write requests, for example, may be one or more of the unit-length data blocks. A specific quantity may be set flexibly by the controller. Alternatively, the controller may determine, according to the available offset after selecting the first segment and the available offset, the target data to be written to the solid state disk and the data length of the target data. Herein, the data length should be less than a size of available storage space of the first segment and is determined based on the available offset, and the target data may be one or more of the unit-length data blocks.

With reference to the first aspect, in a first implementation of the first aspect, the controller is further configured to record states of the multiple dies, and the controller is further configured to select a stateless die from the multiple dies as the first die.

With reference to the first aspect or the first implementation of the first aspect, in a second implementation of the first aspect, the controller is further configured to determine an access frequency of the target data based on a host logical block address of the target data, and if the access frequency of the target data is greater than an access frequency threshold, the controller is further configured to select a die in which an amount of included data whose access frequency is greater than the access frequency threshold is less than a first threshold as the first die.

Optionally, the controller is further configured to query, based on a host logical block address of each unit-length data block that is obtained by performing the foregoing splitting and/or combining operation, an access frequency table to determine an access frequency of each data block, and may identify, from a query result, whether each data block is hot data or cold data. Then, the controller queries a cold and hot data distribution table, compares an amount of hot data currently already stored in each die and recorded in the cold and hot data distribution table with the first threshold, and selects a die from dies in which amounts of hot data are less than the first threshold as the first die, where the first die may be used to store one or more of the unit-length data blocks that are identified as hot data. Optionally, if it is found that amounts of hot data currently stored in multiple dies are all less than the first threshold, the controller may select a die that currently stores a smallest amount of hot data as the first die. Optionally, if it is found that amounts of hot data currently stored in multiple dies are less than the first threshold, the controller may also select the first die from the multiple dies by further referring to any one or more of the foregoing first implementation of the first aspect, or a third, fourth, or fifth implementation of the first aspect that will be described later. Optionally, multiple first dies may also be selected, and each first die is used to store some of the multiple unit-length data blocks that are hot data.

With reference to any one of the first aspect or the foregoing implementations of the first aspect, in a third implementation of the first aspect, the controller is further configured to record an amount of valid data stored in each of the multiple dies, and the controller is further configured to select a die in which an amount of valid data is less than a second threshold as the first die.

With reference to any one of the first aspect or the foregoing implementations of the first aspect, in a fourth implementation of the first aspect, the controller is further configured to record a wear degree of each of the multiple dies, and the controller is further configured to select a die whose wear degree is less than a wear degree threshold as the first die.

With reference to any one of the first aspect or the first to the fourth implementations of the first aspect, in a fifth implementation of the first aspect, the controller is further configured to record a quantity of read requests to be processed in each of the multiple dies, and the controller is further configured to select a die in which there is no read request to be processed as the first die, or select a die in which a quantity of read requests to be processed is less than a third threshold as the first die.

With reference to any one of the first aspect or the foregoing implementations of the first aspect, in a sixth implementation of the first aspect, the controller is further configured to select a certain segment as the first segment if the certain segment is already allocated to the first die and has available storage space, or select a blank segment from the multiple segments as the first segment.

Optionally, that the controller determines the target data and the data length based on the available offset after selecting the first segment and determining the available offset is further determining current remaining available storage space in the first segment based on the available offset, where the data length of the target data in the write request cannot exceed a size of the remaining available storage space, and selecting the target data based on the determined data length, where the target data may be one or more of the unit-length data blocks.

Optionally, as described above, the target data and the data length of the target data may also be determined by the controller before selecting the first die. In this case, before generating the write request, the controller may first compare the determined data length of the target data with the available storage space of first segment which is determined based on the available offset of the first segment. If the data length of the target data is less than the size of the available storage space of first segment, the target data and the data length of the target data are directly included into the write request. If the data length of the target data is greater than the size of the available storage space of first segment, the controller needs to split the target data into two sub blocks according to the size of the available storage space of first segment, where a data length of a first sub block is less than or equal to the size of the available storage space of first segment, and a second sub block is a remaining part other than the first sub block in the target data. In this case, when generating the write request, the controller includes the first sub block that is obtained by splitting and the corresponding data length of the first sub block into the write request as the target data and the data length of the target data respectively. For the second sub block, steps of selecting the first segment and determining the available offset, and generating the write request may be performed repeatedly, or optionally, steps of selecting the first die, selecting the first segment and confirming the available offset, and generating the write request may be performed repeatedly.

With reference to any one of the first aspect or the foregoing implementations of the first aspect, in a seventh implementation of the first aspect, the controller is further configured to generate a mapping relationship, where the mapping relationship is configured to record a mapping between the host logical block address of the target data and the channel connected to the first die, the first die, the first segment, and the available offset, and store the mapping relationship in a system mapping table.

With reference to any one of the first aspect or the foregoing implementations of the first aspect, in an eighth implementation of the first aspect, the solid state disk is further configured to query a local mapping table according to the identifier of the first segment and the available offset included in the write address, where the local mapping table is configured to store a mapping relationship between a segment and a physical block address of the solid state disk, and determine a page identifier according to the available offset included in the write address, and write, based on the data length of the target data and starting from a page corresponding to the page identifier, the target data into a block if the block corresponding to the first segment is recorded in the local mapping table, or else, select a blank block from multiple blocks of the first die based on the identifier of the channel connected to the first die and the identifier of the first die, determine a page identifier according to the available offset included in the write address, and write, based on the data length of the target data and starting from a page corresponding to the page identifier, the target data into the blank block.

With reference to the eighth implementation of the first aspect, in a ninth implementation of the first aspect, the solid state disk is further configured to generate a new mapping relationship, where the new mapping relationship is configured to record a mapping between the first segment and the blank block, and store the new mapping relationship in the local mapping table.

Optionally, the local mapping table may be a local mapping table of a multi-dimensional array, or may be local mapping tables at multiple levels.

Optionally, the local mapping table may also store a mapping relationship between "segment+available offset" and "physical block address of the solid state disk," where the physical block address of the solid state disk includes a block identifier and a page identifier.

In this embodiment of the present disclosure, when there is data to be written to the solid state disk, the controller needs to select the first die, requiring that the target data to be written should be stored in a block included in the first die, and subsequently, the solid state disk needs to allocate a physical storage resource in a range of the first die to store the target data. This avoids a problem that storage resources of a solid state disk cannot be effectively used due to unbalanced data distribution, congestion of some dies, or the like caused because the solid state disk autonomously allocates a physical storage resource to a write request totally based on an internal policy. Further, when selecting the first die, the controller may flexibly use a selection policy, for example, one or more of factors such as a state of a die, a data access frequency, an amount of valid data in a die, a wear degree of a die, and a quantity of read requests to be processed in a die in order to select an optimal die for the data to be written to the solid state disk such that the controller can effectively use the storage space of the solid state disk.

According to a second aspect, an embodiment of the present disclosure provides another storage system, where the storage system includes a controller and a solid state disk, the controller is capable of communicating with the solid state disk, the solid state disk includes multiple channels, and each of the multiple channels is connected to multiple dies, where the controller is configured to create multiple segments, select a first die from the multiple dies, select a first segment from the multiple segments, and determine an available offset of the first segment, generate a write request, where the write request includes a write address, target data, and a data length of the target data, the write address includes an identifier of the first segment and the available offset, and the identifier of the first segment includes an identifier of the first die and an identifier of a channel connected to the first die, and send the write request to the solid state disk to which the first die belongs, and the solid state disk is configured to receive the write request, and store the target data according to the write address and the data length of the target data.

With reference to the second aspect, this embodiment of the present disclosure further provides a first implementation to a fifth implementation of the second aspect. The first implementation to the fifth implementation of the second aspect are the same as the first implementation to the fifth implementation of the first aspect respectively, and are not further described herein.

With reference to any one of the second aspect or the foregoing implementations of the second aspect, in a sixth implementation of the second aspect, the controller is further configured to generate a mapping relationship, where the mapping relationship is configured to record a mapping between a host logical block address of the target data and the first segment and the available offset, and store the mapping relationship in a system mapping table.

With reference to any one of the second aspect or the foregoing implementations of the second aspect, in a seventh implementation of the second aspect, the solid state disk is further configured to query a local mapping table according to the identifier of the first segment and the available offset included in the write address, where the local mapping table is configured to store a mapping relationship between a segment and a physical block address of the solid state disk, and determine a page identifier according to the available offset included in the write address, and write, based on the data length of the target data and starting from a page corresponding to the page identifier, the target data into a block if the block corresponding to the first segment is recorded in the local mapping table, or else, parse the identifier of the first segment to obtain the identifier of the channel connected to the first die and the identifier of the first die, select a blank block from multiple blocks of the first die based on the identifier of the channel connected to the first die and the identifier of the first die, determine a page identifier according to the available offset included in the write address, and write, based on the data length of the target data and starting from a page corresponding to the page identifier, the target data into the blank block.

According to a third aspect, an embodiment of the present disclosure provides a solid state disk, where the solid state disk includes a processor, a memory, a communications interface, and multiple channels, the processor and the memory are respectively connected to multiple dies via each of the multiple channels, each of the multiple dies includes multiple blocks, and the processor, the memory, and the communications interface are capable of communicating with each other, where the communications interface is configured to receive a write request, where the write request includes a write address, target data, and a data length of the target data, and the write address includes an identifier of a first die, an identifier of a channel connected to the first die, an identifier of a first segment, and an available offset, the memory is configured to store a local mapping table, where the local mapping table is configured to record a mapping relationship between a segment and a physical block address of the solid state disk, and the physical block address of the solid state disk includes a block identifier, and the processor is configured to query the local mapping table according to the identifier of the first segment and the available offset included in the write address, and determine a page identifier according to the available offset, and write, based on the data length of the target data and starting from a page corresponding to the page identifier, the target data into a block if the block corresponding to the first segment is recorded in the local mapping table, or else, select a blank block from multiple blocks of the first die based on the identifier of the channel connected to the first die and the identifier of the first die, determine a page identifier according to the available offset included in the write address, and write, based on the data length of the target data and starting from a page corresponding to the page identifier, the target data into the blank block.

With reference to the third aspect, in a first implementation of the third aspect, the processor is further configured to generate a new mapping relationship, where the new mapping relationship is configured to record a mapping between the first segment and the blank block, and store the new mapping relationship in the local mapping table.

Optionally, the local mapping table may be a local mapping table of a multi-dimensional array, or may be local mapping tables at multiple levels.

Optionally, the local mapping table may also store a mapping relationship between "segment+available offset" and "physical block address of the solid state disk," where the physical block address of the solid state disk includes a block identifier and a page identifier.

According to a fourth aspect, an embodiment of the present disclosure provides a solid state disk, where the solid state disk includes a processor, a memory, a communications interface, and multiple channels, the processor and the memory are respectively connected to multiple dies via each of the multiple channels, each of the multiple dies includes multiple blocks, and the processor, the memory, and the communications interface are capable of communicating with each other, wherein the communications interface is configured to receive a write request, where the write request includes a write address, target data, and a data length of the target data, the write address includes an identifier of a first segment and an available offset, and the identifier of the first segment carries an identifier of a first die and an identifier of a channel connected to the first die, the memory is configured to store a local mapping table, where the local mapping table is configured to record a mapping relationship between a segment and a physical block address of the solid state disk, and the physical block address of the solid state disk includes a block identifier, and the processor is configured to query the local mapping table according to the identifier of the first segment and the available offset included in the write address, and determine a page identifier according to the available offset, and write, based on the data length of the target data and starting from a page corresponding to the page identifier, the target data into a block if the block corresponding to the first segment is recorded in the local mapping table, or else parse the identifier of the first segment to obtain the identifier of the first die and the identifier of the channel connected to the first die, select a blank block from multiple blocks of the first die based on the identifier of the channel connected to the first die and the identifier of the first die, determine a page identifier according to the available offset included in the write address, and write, based on the data length of the target data and starting from a page corresponding to the page identifier, the target data into the blank block.

With reference to the fourth aspect, in a first implementation of the fourth aspect, the processor is further configured to generate a new mapping relationship, where the new mapping relationship is configured to record a mapping between the first segment and the blank block, and store the new mapping relationship in the local mapping table.

Optionally, the local mapping table may be a local mapping table of a multi-dimensional array, or may be local mapping tables at multiple levels.

Optionally, the local mapping table may also store a mapping relationship between "segment+available offset" and "physical block address of the solid state disk," where the physical block address of the solid state disk includes a block identifier and a page identifier.

According to a fifth aspect, an embodiment of the present disclosure provides a method for writing data to a solid state disk, wherein the method is applicable to a storage system, the storage system includes a controller and the solid state disk, the controller is capable of communicating with the solid state disk, the solid state disk includes multiple channels, and each of the multiple channels is connected to multiple dies, the controller creates multiple segments in advance, and the method includes selecting, by the controller, a first die from the multiple dies, selecting, by the controller, a first segment from the multiple segments, and determining an available offset of the first segment, generating, by the controller, a write request, where the write request includes a write address, target data, and a data length of the target data, and the write address includes an identifier of a channel connected to the first die, an identifier of the first die, an identifier of the first segment, and the available offset, and sending, by the controller, the write request to the solid state disk.

In this embodiment of the present disclosure, before selecting the first die, the controller receives one or more host write requests from a host, where each host write request carries a host logical block address, data, and a data length, and the host logical block address is a start logical block address for writing the data by the host, the data is data to be written to the storage system, and the data length is used to identify a length of the data. The controller may cache the data, and may perform, using a capacity of a page of the solid state disk as a unit, a splitting and/or combining operation on the data carried in the host write request to generate multiple unit-length data blocks. The controller may perform the step of selecting the first die immediately after receiving the host write request, or may start performing the step of selecting the first die when a first condition is met. The first condition may be that the data length of the cached data is greater than a specified threshold, or may be that the controller enters a new data write cycle.

Before selecting the first die, the controller may further first determine the target data to be written to the solid state disk and the data length of the target data. The target data may be one or more of the unit-length data blocks. A specific quantity may be set flexibly by the controller. Alternatively, the controller may determine, after selecting the first segment and the available offset, the target data to be written to the solid state disk and the data length of the target data. Herein, the data length should be less than available storage space that is in the first segment and is confirmed based on the available offset, and the target data may be one or more of the unit-length data blocks.

With reference to the fifth aspect, in a first implementation of the fifth aspect, the first die is a stateless die.

With reference to the fifth aspect or the first implementation of the fifth aspect, in a second implementation of the fifth aspect, the controller determines an access frequency of the target data based on a host logical block address of the target data, and if the access frequency of the target data is greater than an access frequency threshold, an amount of data that is stored in the first die and whose access frequency is greater than the access frequency threshold is less than a first threshold.

Optionally, the controller is further configured to query, based on a host logical block address of each unit-length data block that is obtained by performing the foregoing splitting and/or combining operation, an access frequency table to determine an access frequency of each data block, and may identify, from a query result, whether each data block is hot data or cold data. Then, the controller queries a cold and hot data distribution table, compares an amount of hot data currently already stored in each die and recorded in the cold and hot data distribution table with the first threshold, and selects a die from dies in which amounts of hot data are less than the first threshold as the first die, where the first die may be used to store one or more of the unit-length data blocks that are identified as hot data. Optionally, if it is found that amounts of hot data currently stored in multiple dies are less than the first threshold, the controller may select a die that currently stores a smallest amount of hot data as the first die. Optionally, if it is found that amounts of hot data currently stored in multiple dies are all less than the first threshold, the controller may also select the first die from the multiple dies by further referring to any one or more of the foregoing first implementation of the first aspect, or a third, fourth, or fifth implementation of the first aspect. Optionally, multiple first dies may also be selected, and each first die is used to carry some of the multiple unit-length data blocks that are hot data.

With reference to any one of the fifth aspect or the foregoing implementations of the fifth aspect, in a third implementation of the fifth aspect, an amount of valid data stored in the first die is less than a second threshold.

With reference to any one of the fifth aspect or the foregoing implementations of the fifth aspect, in a fourth implementation of the fifth aspect, a wear degree of the first die is less than a wear degree threshold.

With reference to any one of the fifth aspect or the foregoing implementations of the fifth aspect, in a fifth implementation of the fifth aspect, there is no read request to be processed in the first die, or a quantity of read requests to be processed in the first die is less than a third threshold.

With reference to any one of the fifth aspect or the foregoing implementations of the fifth aspect, in a sixth implementation of the fifth aspect, the first segment is a blank segment.

With reference to any one of the fifth aspect or the foregoing implementations of the fifth aspect, in a seventh implementation of the fifth aspect, the first segment is already allocated to the first die, and there is available storage space in the first segment.

Optionally, that the controller determines the target data and the data length based on the available offset after selecting the first segment and determining the available offset is further determining current remaining available storage space in the first segment based on the available offset, where the data length of the target data in the write request cannot exceed the remaining available storage space, and selecting the target data based on the determined data length, where the target data may be one or more of the unit-length data blocks.

Optionally, as described above, the target data and the data length of the target data may also be determined by the controller before selecting the first die. In this case, before generating the write request, the controller may first compare the determined data length of the target data with the size of the available storage space of the first segment which is determined based on the available offset of the first segment. If the data length of the target data is less than the size of the available storage space of the first segment, the target data and the data length of the target data are directly included into the write request. If the data length of the target data is greater than the size of the available storage space of the first segment, the controller needs to split the target data into two sub blocks according to the available storage space in the first segment, where a data length of a first sub block is less than or equal to the size of the available storage space of the first segment, and a second sub block is a remaining part other than the first sub block in the target data. In this case, when generating the write request, the controller includes the first sub block that is obtained by splitting and the corresponding data length of the first sub block into the write request as the target data and the data length of the target data respectively. For the second sub block, steps of selecting the first segment and confirming the available offset, and generating the write request may be performed repeatedly, or optionally, steps of selecting the first die, selecting the first segment and confirming the available offset, and generating the write request may be performed repeatedly.

With reference to any one of the fifth aspect or the foregoing implementations of the fifth aspect, in an eighth implementation of the fifth aspect, the controller generates a mapping relationship, where the mapping relationship is configured to record a mapping between a host logical block address of the target data and the channel connected to the first die, the first die, the first segment, and the available offset, and stores the mapping relationship in a system mapping table.

In this embodiment of the present disclosure, when there is data to be written to the solid state disk, the controller needs to select the first die, indicating that the target data to be written should be stored in a block included in the first die. This avoids a problem that storage resources of a solid state disk cannot be effectively used due to unbalanced data distribution, congestion of some dies, or the like caused because the solid state disk autonomously allocates a physical storage resource to a write request totally based on an internal policy. Further, when selecting the first die, the controller may flexibly use a selection policy, for example, one or more of factors such as a state of a die, a data access frequency, an amount of valid data in a die, a wear degree of a die, and a quantity of read requests to be processed in a die in order to select an optimal die for the data to be written to the solid state disk such that the controller can effectively use the storage space of the solid state disk.

According to a sixth aspect, an embodiment of the present disclosure provides a controller, wherein the controller includes a processor, a memory, and a second communications interface. The memory stores a program instruction. The processor is configured to execute the program instruction to complete various processing actions of the controller, further as described in the first, second, and fifth aspects of this application. The memory is further configured to store a system mapping table. The second communications interface is configured to communicate with a solid state disk. Using the second communications interface, the processor may send an operation instruction such as a write request or a read request to the solid state disk, and receive various messages from the solid state disk. The controller further includes a first communications interface, where the first communications interface is configured to communicate with a host. The controller may receive an operation instruction of the host such as a host read request or a host write request using the first communications interface, and hand over the operation instruction to the processor for processing. The first communications interface is further configured to send a message such as a write success message, a write failure message, a read failure message, or read data to the host. The first communications interface may be a host bus adapter card. The memory may be further configured to cache data carried in the host write request received by the first communications interface from the host, or cache data read from the solid state disk.

According to a seventh aspect, an embodiment of the present disclosure provides a controller, wherein the controller includes a first communication module, a storage module, a die selection module, a segment selection module, a processing module, and a second communication module. The first communication module is configured to communicate with a host, and receive an operation instruction of the host, such as a host read request or a host write request, and is further configured to send a message such as a write success message, a write failure message, a read failure message, or read data to the host.

The storage module may be configured to cache data carried in the host write request received by the first communication module from the host.

The processing module may be configured to perform a splitting and/or combining operation on the cached data to generate unit-length (such as 16 kilobytes (KB)) data blocks and a host logical block address of each data block, may be configured to determine target data to be written to a solid state disk and a data length of the target data, and may be further configured to create multiple segments, and store basic information about the multiple created segments in the storage module.

The die selection module is configured to select a first die. For details, refer to the first to the fifth implementations of the first aspect, the first to the fifth implementations of the second aspect, and the first to the fifth implementations of the fifth aspect of this application.

The segment selection module is configured to select a first segment and determine an available offset. For details, refer to the sixth implementation of the first aspect, the sixth implementation of the second aspect, and the sixth and the seventh implementations of the fifth aspect of this application.

The processing module is further configured to generate a write request according to the first die selected by the die selection module, and the first segment selected and the available offset determined by the segment selection module. Optionally, the processing module is further configured to determine the target data and the data length of the target data according to a value of the available offset of the first segment, and generate the write request based on the target data and the data length of the target data, and further configured to generate a system mapping table, and update the system mapping table in real time. For details, refer to various implementations of the first, the second, and the fifth aspects of this application.

The storage module is further configured to store the system mapping table.

The second communication module is configured to communicate with the solid state disk. Using the second communication module, the processing module may send various operation commands such as a write request and a read request to the solid state disk, and receive various messages from the solid state disk.

The processing module is further configured to query the system mapping table according to the host read request received by the first communication module from the host, generate a second read request, and send the second read request to the solid state disk using the second communication module. The second communication module receives read data returned by the solid state disk. The storage module is further configured to cache the read data. The processing module is further configured to send the read data to the host using the first communication module.

According to an eighth aspect, an embodiment of the present disclosure provides a solid state disk, wherein the solid state disk includes a communication module, a cache module, a processing module, and a storage module.

The communication module is configured to communicate with a controller, and receive a message such as a write request, a read request, or another instruction from the controller, and further configured to send a message such as a write success message, a write failure message, a read success message, or a read failure message to the controller.

The cache module is configured to cache data carried in the message received by the communication module from the controller.

The processing module is configured to generate a local mapping table in advance, where the local mapping table may be stored in the cache module, or may be stored in the storage module, and when required for use, read by the processing module and cached in the cache module, and further configured to process the write request received by the communication module. For details, refer to the eighth implementation of the first aspect, the seventh implementation of the second aspect, the third aspect, and the fourth aspect of this application.

The processing module is further configured to generate a new mapping relationship and store the mapping relationship in the local mapping table. For details, refer to the ninth implementation of the first aspect of this application.

The processing module is further configured to query the local mapping table based on the read request received by the communication module, read data from the storage module based on a query result, and send the read data to a host using the communication module.

According to a ninth aspect, an embodiment of the present disclosure provides a storage medium, wherein the storage medium stores a program. When a computing device runs the program, the computing device performs processing actions of a controller in the storage system according to any one of the first aspect or the implementations of the first aspect, or performs processing actions of a controller in the storage system according to any one of the second aspect or the implementations of the second aspect, or performs the method for writing data to a solid state disk according to any one of the fifth aspect or the implementations of the fifth aspect, or performs actions of the controller according to any one of the sixth aspect or the implementations of the sixth aspect, or performs actions of the controller according to any one of the seventh aspect or the implementations of the seventh aspect. The storage medium includes but is not limited to a flash memory, a hard disk drive (HDD), or a solid state disk.

According to a tenth aspect, an embodiment of the present disclosure provides a storage medium, wherein the storage medium stores a program. When a computing device runs the program, the computing device performs processing actions of a solid state disk in the storage system according to any one of the first aspect or the implementations of the first aspect, or performs processing actions of a solid state disk in the storage system according to any one of the second aspect or the implementations of the second aspect, or performs actions of the solid state disk according to any one of the third aspect or the implementations of the third aspect, or performs actions of the solid state disk according to any one of the fourth aspect or the implementations of the fourth aspect, or performs actions of the solid state disk according to any one of the eighth aspect or the implementations of the eighth aspect. The storage medium includes but is not limited to a flash memory, an HDD, or a solid state disk.

According to an eleventh aspect, an embodiment of the present disclosure provides a computer program product, wherein the computer program product includes a program instruction. When a computer runs the computer program product, the computer performs processing actions of a controller in the storage system according to any one of the first aspect or the implementations of the first aspect, or performs processing actions of a controller in the storage system according to any one of the second aspect or the implementations of the second aspect, or performs the method for writing data to a solid state disk according to any one of the fifth aspect or the implementations of the fifth aspect, or performs actions performed by the controller according to any one of the sixth aspect or the implementations of the sixth aspect, or performs actions performed by the controller according to any one of the seventh aspect or the implementations of the seventh aspect. The computer program product may be a software installation package.

According to an twelfth aspect, an embodiment of the present disclosure provides a computer program product, wherein the computer program product includes a program instruction. When a computer runs the computer program product, the computer performs processing actions of a solid state disk in the storage system according to any one of the first aspect or the implementations of the first aspect, or performs processing actions of a solid state disk in the storage system according to any one of the second aspect or the implementations of the second aspect, or performs actions of the solid state disk according to any one of the third aspect or the implementations of the third aspect, or performs actions of the solid state disk according to any one of the fourth aspect or the implementations of the fourth aspect, or performs actions of the solid state disk according to any one of the eighth aspect or the implementations of the eighth aspect.

In the embodiments of the present disclosure, when there is data to be written to the solid state disk, the controller needs to select the first die, requiring that the target data to be written should be stored in a block included in the first die, and subsequently, the solid state disk needs to allocate a physical storage resource in a range of the first die to store the target data. This avoids a problem that storage resources of a solid state disk cannot be effectively used due to unbalanced data distribution, congestion of some dies, or the like caused because the solid state disk autonomously allocates a physical storage resource to a write request totally based on an internal policy. Further, when selecting the first die, the controller may flexibly use a selection policy, for example, one or more of factors such as a state of a die, a data access frequency, an amount of valid data in a die, a wear degree of a die, and a quantity of read requests to be processed in a die in order to select an optimal die for the data to be written to the solid state disk such that the controller can effectively use the storage space of the solid state disk.

BRIEF DESCRIPTION OF DRAWINGS

To describe the technical solutions in the embodiments of the present disclosure more clearly, the following briefly describes the accompanying drawings required for the embodiments.

DESCRIPTION OF EMBODIMENTS

Embodiments of the present disclosure provide a storage system and a solid state disk to use storage space of the solid state disk effectively and properly.

Figure 1:
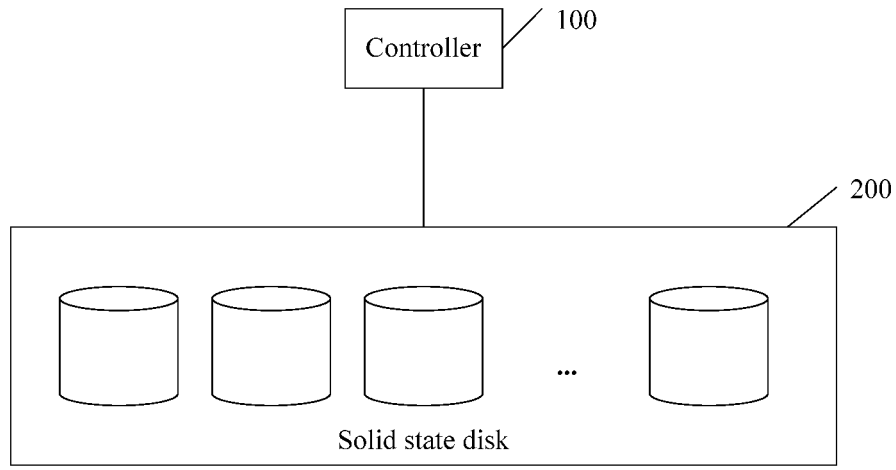
FIG. 1 is an application scenario diagram according to an embodiment of the present disclosure.

FIG. 1 depicts a composition diagram of a storage system according to an embodiment of the present disclosure. The storage system includes a controller 100 and a solid state disk 200. In actual networking, there may be multiple solid state disks 200.

Communication can be performed between the controller 100 and a host (not shown), for example, using a storage area network (SAN), or using another network, such as an Ethernet, a local area network, or a wide area network, etc.

The controller 100 may be a computing device, such as a server or a desktop computer. On the controller 100, an operating system and an application program may be installed. The controller 100 may receive an input/output (I/O) request from the host. The controller 100 may further store data (if any) carried in the I/O request, and write the data to any solid state disk 200.

FIG. 1 is used only as an example for description. In an actual application, the storage system may include multiple controllers. A physical structure and functions of each controller are similar to those of the controller 100. Mutual communication can be performed between controllers, and between each controller and the solid state disk 200. In this embodiment, a quantity of controllers, a connection mode between controllers, and a connection mode between any controller and the solid state disk 200 are not limited.

The controller 100 is a system controller in the storage system. The system controller is generally an independent device. Unless otherwise specified, the controllers in this embodiment are system controllers.

Figure 2:
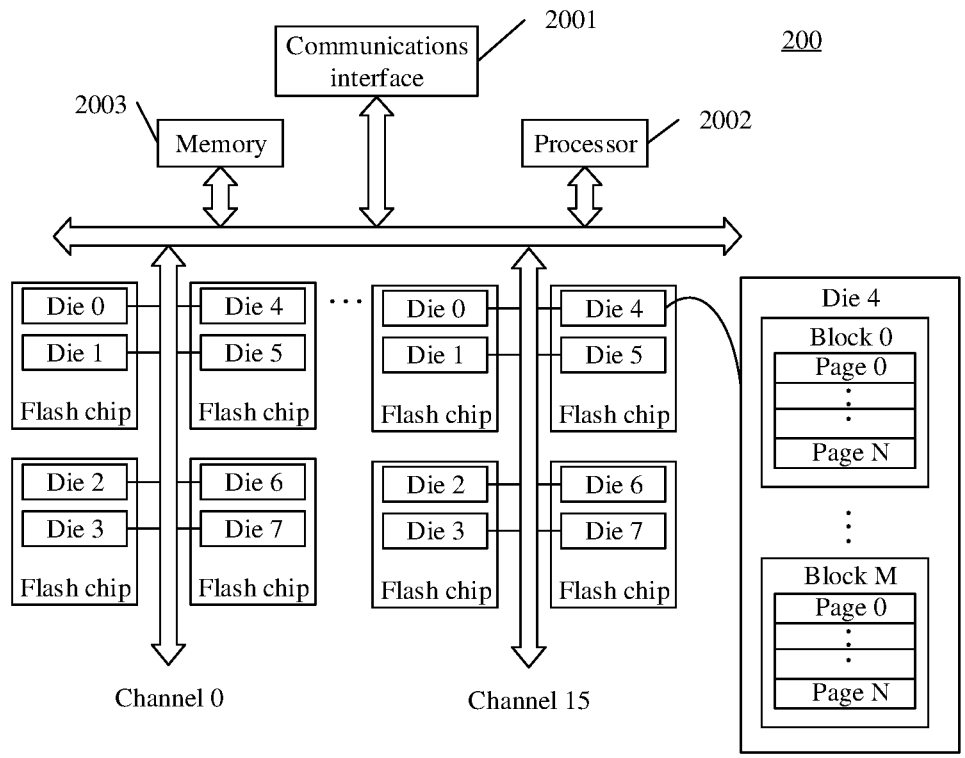
FIG. 2 is a structural diagram of a solid state disk according to an embodiment of the present disclosure.

As shown in FIG. 2, FIG. 2 is a schematic structural diagram of a solid state disk 200 according to an embodiment of the present disclosure. The solid state disk 200 includes a communications interface 2001, a processor 2002, and a memory 2003. The communications interface 2001, the processor 2002, and the memory 2003 are capable of communicating with each other. The solid state disk 200 further includes a plurality of flash chips. The plurality of flash chips are storage medium of the solid state disk 200. The solid state disk 200 further includes multiple channels (e.g. channel 0 and channel 15 shown in FIG. 2). The processor 2002 and the memory 2003 respectively communicate with a portion of the plurality of flash chips via each channel.

The communications interface 2001 is configured to communicate with a controller, such as the controller 100 shown in FIG. 1, and receive a message such as a write request, a read request, or another command from the controller, and further configured to send a message such as a write success message, a write failure message, a read success message, or a read failure message to the controller.

The memory 2003 is configured to cache data carried in the message received by the controller or data read from the flash chip. The memory 2003 may be a non-transitory machine readable medium that can store data, such as a random access memory (RAM), a read-only memory (ROM), a flash memory, or a solid state disk, etc. This is not limited herein. The memory 2003 may further store a program instruction.

The processor 2002 may be a central processing unit (CPU) or a specific-integrated circuit, such as Application-Specific Integrated Circuit (ASIC), or is configured as one or more integrated circuits for implementing this embodiment of the present disclosure. In this embodiment of the present disclosure, the processor 2002 may be configured to execute the program instruction stored in the memory 2003 to complete corresponding processing, for example, processing the message (such as a read request or a write request) from the controller 100, and various management operations of the solid state disk 200, for example, creating and updating a local mapping table, or garbage collection, etc. For details, refer to detailed descriptions of the following method embodiments. Herein, the local mapping table created and updated by the processor 2002 by running the program instruction may be stored in the memory 2003.

As shown in FIG. 2, in the solid state disk 200, the processor 2002 and the memory 2003 respectively communicate with a portion of the plurality flash chips via each channel. The channels are independent of each other, and may implement concurrent processing of messages. That is, the processor 2002 may perform message or data transmission with different flash chips separately using each channel. In the example of FIG. 2, the solid state disk has 16 channels. However, a person skilled in the art may understand that, a quantity of channels in the solid state disk 200 is not limited in this embodiment of the present disclosure.

The flash chip may be a single layer cell (SLC), or may be a multi-layer cell (MLC), or may be another storage unit. Each flash chip includes one or more dies. Each die includes M blocks. Each block includes N pages. A person of ordinary skill in the art may understand that, a quantity of dies included in each flash chip in the solid state disk, the quantity M of blocks included in each die, and the quantity N of pages included in each block may be set to different values based on different capacity settings of the flash chip, die, block, and page. For example, if a capacity of each page is set to 16 KB, and a capacity of each block is set to 8 megabytes (MB), a value of N is set to 512, that is, each block may include 512 pages, if a capacity of each die is set to 16 gigabytes (GB), a value of M is 2048, that is, each die may include 2048 blocks. For example, if each flash chip includes two dies, a capacity of each flash chip is 32 GB, if each channel may be connected to four flash chips, it indicates that eight dies may be connected to the channel, and in this case, a capacity managed in each channel is 128 GB. Referring to FIG. 2, if the solid state disk 200 includes 16 channels, a total capacity of the solid state disk 200 is 2 terabytes (TB). A person of ordinary skill in the art may understand that, in the solid state disk 200, each write operation is to write data in a unit of page, each read operation may read a whole page or a part of a page, a die is a minimum concurrent unit in the solid state disk 200, that is, each die can process only one message at any time, for example, a read request, a write request, or an erase command. During processing of the message, no response can be made to other messages. Using the solid state disk 200 shown in FIG. 2 as an example, a maximum of eight messages can be processed in each channel at any time, and a maximum of 128 messages can be processed in the solid state disk 200 at any time.

Figure 3:
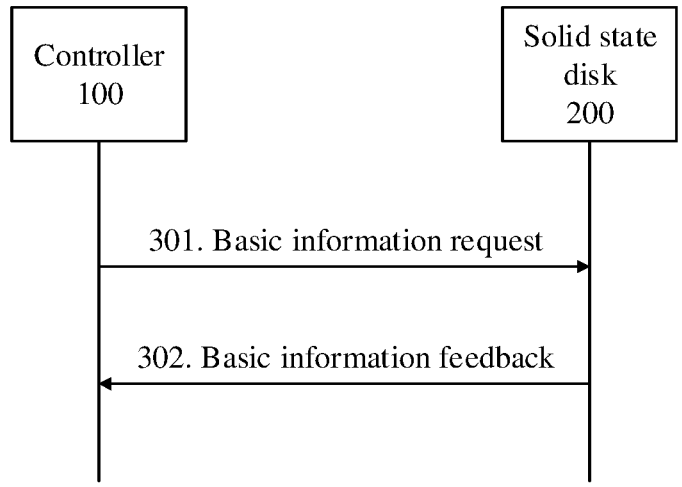
FIG. 3 is an initialization flowchart of accessing a storage system by a solid state disk according to an embodiment of the present disclosure.

As shown in FIG. 3, FIG. 3 is an initialization flowchart of accessing a storage system by a solid state disk 200 according to an embodiment of the present disclosure. The procedure is performed when the storage system is powered on, or when a new solid state disk accesses the storage system such that a controller 100 can obtain basic information about the solid state disk 200, and that the controller 100 can manage and schedule storage space of the solid state disk 200.

Step 301: The controller 100 sends a basic information request message to the solid state disk 200.

The storage system is powered on. The controller 100 may send a basic information request message to the solid state disk 200 in the storage system in a broadcast or multicast mode, or may send a basic information request message to each solid state disk 200 in the storage system in a unicast mode. In a running process of the storage system, the controller 100 may further periodically send the basic information request message to discover a newly connected solid state disk 200. The communications interface 2001 of the solid state disk 200 receives the basic information request message from the controller 100.

Step 302: The solid state disk 200 sends a basic information feedback message to the controller 100.

After receiving the basic information request message, the solid state disk 200 adds basic information about the solid state disk 200 to the basic information feedback message and sends the message to the controller 100. For example, the processor 2002 shown in FIG. 2 may add the basic information about the solid state disk 200 to the basic information feedback message and send the message to the controller 100 using the communications interface 2001 shown in FIG. 2. In this embodiment of the present disclosure, the basic information may include one or more of an identifier of the solid state disk 200, a capacity of the solid state disk 200, a quantity of channels, a quantity of dies in each channel, a quantity of blocks in each die, a quantity of pages in each block, a capacity of each page, or the like. Optionally, the solid state disk 200 may further report a channel identifier of each channel of the solid state disk 200 together with a die identifier of each die in each channel to the controller 100.

In this embodiment of the present disclosure, after the controller 100 receives the basic information feedback reported by each solid state disk 200, if each solid state disk 200 reports only a quantity of channels, a quantity of dies in each channel, and a quantity of blocks in each die, the controller 100 may allocate an identifier to each channel and each die in each solid state disk 200. Optionally, the controller 100 may allocate an identifier according to a current general implementation in the industry. Assuming that the solid state disk 200 includes 16 channels, and that each channel includes 8 dies, channel identifiers may be a channel 0, a channel 1, . . . , a channel 15 in sequence, die identifiers of the dies in each channel may be a die 0, a die 1, . . . , a die 7. Therefore, the controller 100 needs to identify and distinguish all 128 dies in each solid state disk based on "identifier of the solid state disk, a channel identifier, and a die identifier". Optionally, the controller 100 may also allocate global identifiers to all the 128 dies in the solid state disk, namely, a die 0, a die 1, a die 2, . . . , a die 126, and a die 127 in sequence. Optionally, the controller 100 may also use a channel identifier as a part of a die identifier when setting the die identifier. For example, an identifier of a first die included in a channel 0 may also be set to "channel 0 die 0." Alternatively, an identifier of a solid state disk and a channel identifier may be jointly used as a part of a die identifier when the die identifier is set. For example, the die identifier may be "solid state disk 200 channel 0 die 0." Further, after the controller 100 allocates identifiers to the channels and dies in each solid state disk 200, the controller 100 may notify the solid state disk 200 of an identifier allocation rule. In this way, subsequently, the solid state disk 200 may accurately identify a corresponding die based on a die identifier allocated by the controller 100.

If each solid state disk 200 further feeds back a channel identifier of each channel and a die identifier of each die in the solid state disk 200 in step 302, the controller 100 does not need to perform allocation itself, but may directly use "identifier of the solid state disk, a channel identifier, and a die identifier" reported by the solid state disk 200 to identify and distinguish each die in each solid state disk.

In the foregoing procedure, after each solid state disk 200 accesses the storage system, the solid state disk 200 feedbacks its basic information to the controller 100. After collecting the basic information about each solid state disk 200 in the storage system, the controller 100 may manage storage space of all the solid state disks 200 and provide a storage service for a host.

In this embodiment of the present disclosure, the controller 100 manages the storage space in a unit of segment and provides the storage service for the host. The controller 100 creates multiple segments. In this embodiment, it is suggested that a capacity of a segment be set to an integer multiple of a capacity of a block in the solid state disk 200. Assuming that the capacity of the block is 8 MB, the capacity of the segment may be set to 8 MB, 16 MB, 24 MB, or the like. It should be emphasized that the capacity of the segment is not limited in this embodiment of the present disclosure. A user may flexibly set the capacity of the segment based on an actual storage requirement. After the capacity of the segment is determined, a quantity of segments that need to be created may be further determined based on the capacity of the solid state disk 200. Basic information may be configured for each segment after the segment is created. For example, the capacity of the solid state disk is 2 TB, and the capacity of the segment is 16 MB. In this case, the controller 100 needs to create 128 K segments (2 TB/16 MB=128 K), and set basic information about each segment. In this embodiment of the present disclosure, the basic information about each segment may include the following fields: segment identifier uniquely identifying a segment, where the segment identifier may be a numeral, a character, or a symbol, or may be any combination of a numeral, a character, or a symbol, host logical block address indicating a host logical block address corresponding to data stored by each offset in the segment, segment state indicating a current state of the segment, where in this embodiment, there may be four states, a free state, a writing state, a full state, and a garbage collection state, where the free state indicates that no data is written to the segment currently, for example, the segment may be an initialized segment or a segment on which garbage collection has just been performed, the writing state indicates that the segment is already allocated and may be used to write data, the full state indicates that all space of the segment is already full, and the garbage collection state indicates that garbage collection is currently performed on the segment, amount of invalid data in the segment is an optional parameter recording an amount of invalid data in the segment, where an initial value is 0, and every time a modification or deletion operation is performed on data of a host logical block address recorded in the segment, 1 is added to the value of the amount of invalid data in the segment, solid state disk identifier is an optional parameter indicating a solid state disk corresponding to the segment when the segment is allocated, channel identifier is an optional parameter indicating a channel corresponding to the segment when the segment is allocated, die identifier is an optional parameter indicating a die corresponding to the segment when the segment is allocated, and available offset is an optional parameter recording a start position of a current available offset of the segment, where an initial value may be 0. Based on different capacity settings of the segment, a value range of the offset of the segment varies. As described above, in this embodiment of the present disclosure, it is suggested that the capacity of the segment be an integer multiple of the capacity of the block in the solid state disk. Herein, for example, the capacity of the block is 8 MB, and the capacity of the segment is 16 MB, that is, in the solid state disk, there should be two blocks corresponding to each segment. If each block includes 512 pages, the capacity of the segment is equivalent to 1024 pages. In this case, the value range of the offset of the segment may be 0 to 1023. Therefore, the initial value of the available offset of the segment is 0. Each offset corresponds to one page in a block, and as data is written to the segment continuously, the value of the available offset becomes larger. Herein, it may be understood that, when the available offset is set to 0 to 511, the values respectively correspond to 512 pages of a first block in the two blocks corresponding to the segment, and when the available offset is set to 512 to 1023, the values respectively correspond to 512 pages of a second block in the two blocks corresponding to the segment.

When each segment is created, a segment identifier is allocated to the segment, a state of the segment is set to the free state, an available offset and an amount of invalid data in the segment are set to 0, and other basic information may be null first. After the segment is subsequently allocated to the host and data is written, other information items in the basic information about the segment are set. In this embodiment, optionally, the controller 100 may manage all segments in a manner of an array or a linked list. Each node in the array or the linked list represents one segment, and the node is used to record basic information about the segment. Optionally, in this embodiment of the present disclosure, multiple queues may also be used to respectively manage the foregoing segments, blank segment queue is used to manage all unallocated segments, where all segments are placed in the queue for management in an initial phase, and full load segment queue is used when a segment is already allocated to an user and the segment is already full, that is, there is no available space, the segment is placed in the full load segment queue for management.

Further, a partial load segment queue may also be set. If a segment is already allocated, and space equal to an integer multiple of a capacity of a block is occupied, and there is available space in the segment, the segment is placed in the partial load segment queue for management. It may be understood that, if the value of the available offset in the basic information about the segment does not reach a maximum value of the offset of the segment, it indicates that there is available space in the segment. If a computation result obtained according to a formula "(available offset value+1)/quantity of pages included in each block" is a positive integer, it indicates that space equal to an integer multiple of a capacity of a block is occupied in the segment. As shown in the foregoing example, the quantity of pages included in each block may be 512, and each segment may correspond to a capacity of two blocks. In this case, the maximum value of the offset of the segment may be 1023.

Figure 4:
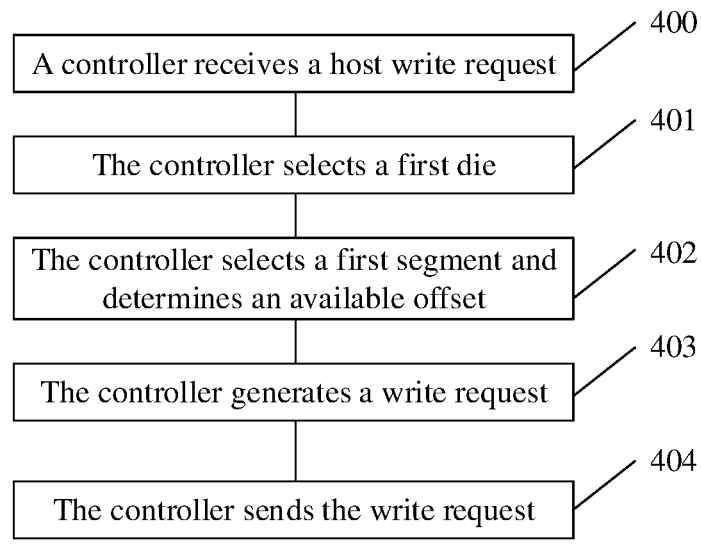
FIG. 4 is a flowchart of a method for processing a write request by a controller according to an embodiment of the present disclosure.

A procedure for storing data by the storage system includes a processing procedure of the controller 100 and a processing procedure of the solid state disk 200. As shown in FIG. 4, FIG. 4 is a flowchart of a method for writing data to a solid state disk by a controller according to an embodiment of the present disclosure.

Step 400: A controller receives a host write request.

Using FIGS. 1 and 2 as examples, the controller 100 receives one or more host write requests from a host, where each host write request carries a host logical block address, data, and a data length, and the host logical block address is a start logical block address for writing the data by the host, the data is data to be written to the storage system, and the data length is used to identify a length of the data.

Optionally, after receiving the host write request, the controller 100 may cache the data carried in the host write request, and then send a write complete message (not shown) to the host, where the write complete message is used to notify the host that the host write request is processed successfully, or may send a write complete message (not shown) to the host after completing subsequent processing and sending the data to the solid state disk 200 and receiving a write success message from the solid state disk 200, where the write complete message is used to notify the host that the host write request is processed successfully.

Optionally, because data lengths of different host write requests sent by the host may vary, if the data of the host write request is directly sent to the solid state disk 200 for storage, a "page overflow" phenomenon may occur, that is, the solid state disk 200 may need to allocate one or more pages for storing the data, however, the last page of the one or more allocated pages is not fully occupied. Therefore, problems such as low usage ratio of space of the solid state disk 200 and complex address management may be caused. To avoid occurrence of the "page overflow" phenomenon, the controller 100 may perform, using a capacity of a page of the solid state disk 200 as a unit, a splitting and/or combining operation on the data carried in the host write request. The splitting operation is as follows. For example, when a host write request carries 3 MB data, based on the foregoing example in which the capacity of the page is 16 KB, the data of the host write request may be split into 3 MB/16 KB=192 data blocks, where a data length of each data block is 16 KB. The combining operation is as follows. If a data length of data carried in a host write request is 10 KB, because the data length of the data is less than a capacity of one page, the data does not need to be split, but may be combined with all or a part of data of another host write request into a 16 KB data block. If a length of data carried in a host write request is 19 KB, the 19 KB data may be first split into two data blocks, where a data length of one data block is 16 KB, and a data length of the other data block is 3 KB, then, the 3 KB data block and all or a part of another host write request are combined into a data block of a 16 KB data length. After receiving multiple host write requests, the controller 100 may flexibly perform the foregoing splitting and/or combining operation to split data of one or more host write requests received from the host into multiple 16 KB data blocks, and obtain, by computation based on a host logical block address carried in each host write request, a host logical block address of each 16 KB data block that is obtained by splitting and/or combining. It should be noted that, in this embodiment, a capacity (such as 16 KB) of one page is used only as an example for description. In an actual application, a splitting and/or combining operation may be performed on data from the host using an integer multiple of the capacity of the page as a unit. A specific size may be set flexibly. After receiving the host write request, the controller 100 may start the following procedure to perform an operation of a subsequent step, or may cache the data carried in the host write request as described above, and when a first condition is met, start the following procedure to perform an operation of a subsequent step. In this embodiment, the first condition may be that the data length of the cached data carried in the host write request is greater than a specific threshold, or the controller 100 may periodically write, to the solid state disk 200, the data that is carried in the host write request and cached by the controller 100, and therefore, the first condition may be that after a new data write cycle is triggered, the following procedure is started to perform the operation of the subsequent step.

Optionally, before performing step 401, the controller 100 may first determine target data to be written to the solid state disk 200 and a data length of the target data. The target data may be one or more of the 16 KB data blocks. A specific quantity may be flexibly set by the controller 100. Alternatively, the controller 100 may determine, after step 402 of the following procedure, the target data to be written to the solid state disk 200 and the data length of the target data.

Step 401: The controller selects a first die.

The controller 100 first selects the first die from multiple dies. In this embodiment of the present disclosure, the controller 100 may select the first die based on multiple criteria, described as follows.

Criterion 1: Random principle

The controller 100 may randomly select any die from the multiple dies as the first die.

Criterion 2: Stateless priority principle

The controller 100 may select a "stateless die" from the multiple dies as the first die. The "stateless die" indicates that the die currently has no message to be processed. In this embodiment, it should be clarified that a possible cause of "currently having no message to be processed" may include no message to be processed in the first die is sent before the controller 100 performs a selection action, or the first die has processed all historical messages when the controller 100 performs a selection action.

Optionally, the controller 100 may maintain a state table in real time, where the state table records a current state of each die in the storage system. An initial state of each die is "stateless." When a message is sent to a die, a state of the die is changed to "stateful," if a processing success or processing failure message returned by the solid state disk 200 is received subsequently, the state of the die is changed to "stateless" again. In this case, when selecting the first die, the controller 100 may query the state table maintained by the controller 100, and select a die that is currently "stateless" as the first die.

Because a die is a minimum concurrent unit of the solid state disk, if data is written to the first die when the first die is a stateless die, real-time quality is highest and a processing time is shortest when the solid state disk to which the first die belongs processes the data write. In this way, efficiency of writing the data to the solid state disk is highest. This helps improve overall processing efficiency of the storage system such that the controller 100 can use storage space of the solid state disk more effectively and properly.

Criterion 3: Performance priority principle

As the user continuously stores data in the storage system, or repeatedly reads some stored data from the storage system based on a user requirement, or modifies some stored data, some data of the user may become hot data because it is frequently accessed, for example, read or modified. And some data of the user becomes cold data because it is not accessed within a period of time or is accessed for few times. Optionally, the controller 100 may maintain an access frequency table, and record an access frequency of each 16 KB data block using a host logical block address of the 16 KB data block as an index. When a data block is written to the solid state disk for the first time, a quantity of times of accessing the data block is 1. Subsequently, every time the data block is accessed, for example, read or modified, 1 is added to the quantity of times of accessing the data block. If the quantity of times of accessing the data block is greater than an access frequency threshold, it may be considered that the data block is hot data, otherwise, if the quantity of times of accessing the data block is less than the access frequency threshold, it may be considered that the data block is cold data. Further, the controller 100 may also record and maintain a cold and hot data distribution table in real time, where the cold and hot data distribution table is used to record distribution of cold and hot data of each die, that is, record an amount of hot data in each die (that is, an amount of data whose access frequency is greater than the access frequency threshold), and record an amount of cold data in each die (that is, an amount of data whose access frequency is less than the access frequency threshold).

Optionally, if the controller 100 has determined, before performing step 401, the target data to be written to the solid state disk 200, the controller 100 queries the access frequency table according to the host logical block address of the target data when selecting the first die to determine an access frequency of the target data, and if it is confirmed that the target data is hot data, the controller 100 queries the cold and hot data distribution table, compares an amount of hot data that is currently stored in each die, which is recorded in the cold and hot data distribution table, with a first threshold, and selects a die from dies in which amounts of hot data are less than the first threshold as the first die. Optionally, if it is found by a query that there are multiple dies in which the amounts of hot data currently stored are less than the first threshold, the controller 100 may select a die that currently stores a smallest amount of hot data from the multiple dies as the first die. Optionally, if it is found by a query that there are multiple dies in which the amounts of hot data currently stored are less than the first threshold, the controller 100 may also select the first die from the multiple dies by further referring to any one or more of the foregoing criteria 1 and 2, or criteria 4 to 6 that will be described later.

Optionally, if the controller 100 has not determined, before performing step 401, the target data to be written to the solid state disk 200, in this step, the controller 100 first queries the access frequency table separately, based on the host logical block address of each 16 KB data block that is obtained by performing the splitting and/or combining operation described above to confirm an access frequency of each 16 KB data block, and may identify, from a query result, whether each 16 KB data block is hot data or cold data. Then, the controller 100 queries the cold and hot data distribution table, compares an amount of hot data currently stored in each die, which is recorded in the cold and hot data distribution table, with the first threshold, and selects a die from dies in which amounts of hot data are less than the first threshold as the first die, where the first die may be used to store the one or more 16 KB data blocks that are identified as hot data. Optionally, if it is found by a query that there are multiple dies in which the amounts of hot data currently stored are less than the first threshold, the controller 100 may select a die that currently stores a smallest amount of hot data from the multiple dies as the first die. Optionally, if it is found by a query that there are multiple dies in which the amounts of hot data currently stored are less than the first threshold, the controller 100 may also select the first die from the multiple dies by further referring to any one or more of the foregoing criteria 1 and 2, or criteria 4 to 6 that will be described later. Optionally, multiple first dies may be selected, and each first die is used to carry a part of the multiple 16 KB data blocks that are hot data. An extreme case is that when L 16 KB data blocks are hot data, L first dies may be selected, where each first die stores one 16 KB data block. For identified one or more 16 KB data blocks that are cold data, optionally, the controller 100 selects, by querying the cold and hot data distribution table, a die from dies in which amounts of hot data currently stored are greater than the first threshold as the first die. Optionally, if it is found by a query that there are multiple dies in which the amounts of hot data currently stored are greater than the first threshold, the controller 100 may select a die that currently stores a largest amount of hot data from the multiple dies as the first die. Optionally, if it is found by a query that there are multiple dies in which the amounts of hot data currently stored are greater than the first threshold, the controller 100 may also select the first die from the multiple dies by further referring to any one or more of the foregoing criteria 1 and 2, or criteria 4 to 6 that will be described later. Optionally, multiple first dies may also be selected, and each first die is used to store a part of the multiple 16 KB data blocks that are cold data. An extreme case is that when L 16 KB data blocks are cold data, L first dies may be selected, where each first die stores one 16 KB data block. Optionally, for the 16 KB data blocks that are cold data, the controller 100 may also not select a die by querying the cold and hot data table, but directly select the first die from the multiple dies by referring to any one or more of the foregoing criteria 1 and 2, or criteria 4 to 6 that will be described later.

As described above, because the die is a minimum concurrent unit of the solid state disk 200, for hot data, when an amount of hot data in the first die is less than the first threshold, the one or more 16 KB data blocks that are hot data are written to the first die, and It can be predicted that real-time quality of processing of the solid state disk 200 to which the first die belongs is relatively good, and that a processing time of writing the one or more 16 KB data blocks to a block included in the first die is relatively short. This helps improve overall processing efficiency of the storage system such that the controller 100 can use the storage space of the solid state disk 200 more effectively.

Further, to identify performance of each die of the solid state disk in a more refined manner, an appropriate selection may be performed based on performance of each die. In this embodiment of the present disclosure, data of the user may be divided into multiple cold or hot levels in the access frequency table. Correspondingly, multiple thresholds may be set when statistics about distribution of cold and hot data in each die are collected. In this way an appropriate first die may be selected by referring to a cold or hot level corresponding to the data.

Criterion 4: Valid data amount balancing principle

The controller 100 may record an amount of valid data stored in each die. In this case, the controller 100 selects a die in which an amount of valid data is less than a second threshold as the first die. If there are multiple dies in which the amounts of valid data are less than the second threshold, the controller 100 has multiple processing manners, selecting a die in which an amount of valid data is smallest as the first die, selecting the first die from the multiple dies in which the amounts of valid data are less than the second threshold by further referring to any one or more of the foregoing criteria 1 to 3, or criteria 5 to 6 that will be described later.

The first die is selected according to this criterion. In this way, an amount of valid data stored in each die may be relatively balanced. Therefore, the controller 100 can use the storage space of the solid state disk 200 more effectively.

Criterion 5: Wear leveling principle

The controller 100 may record a wear degree of each die. The controller 100 selects a die whose wear degree is less than a first wear degree threshold as the first die. If there are multiple dies whose wear degrees are less than the first wear degree threshold, the controller 100 has multiple processing manners selecting a die whose wear degree is lowest as the first die, selecting the first die from the multiple dies whose wear degrees are less than the first wear degree threshold by further referring to any one or more of the foregoing criteria 1 to 4, or a criterion 6 that will be described later.

The controller 100 selects the first die based on the wear leveling balancing principle, and it may accordingly implement balance of wear leveling in the granularity of die, and therefore it can extend a service life of the solid state disk 200, and so the controller 100 can use the storage space of the solid state disk 200 more effectively and properly.

Criterion 6: Read request latency principle

The controller 100 may maintain a message queue. The message queue records a message that is ready to be sent to the solid state disk 200, such as a read request or a write request, or one such message queue may be maintained for each die. When selecting the first die, the controller 100 queries the message queue, and if it is found that currently there is no read request to be processed in a die, selects the die as the first die, or selects a die in which a quantity of read requests currently to be processed is less than a third threshold as the first die. If there is no read request to be processed in multiple dies, the controller 100 may select the first die from the multiple dies in which there is no read request to be processed, by further referring to any one or more of the foregoing criteria 1 to 5. If there are multiple dies in which quantities of read requests currently to be processed are less than the third threshold, the controller 100 has multiple processing manners, selecting a die in which a quantity of read requests currently to be processed is smallest as the first die, selecting the first die by further referring to any one or more of the foregoing criteria 1 to 5.

Use of the criterion 6 can avoid a read latency caused by writing the target data to a die in which a key read request possibly needs to be processed currently. This may enhance overall performance of the storage system such that the controller 100 can use the storage space of the solid state disk 200 more effectively.

Further, in this embodiment of the present disclosure, in an actual application, each of the foregoing criteria 1 to 6 may be used separately, or any one or more of the criteria may be combined for use.

Step 402: The controller selects a first segment and determines an available offset.

As described above, the controller 100 creates multiple segments in advance. In this case, the controller 100 further needs to select the first segment and determine the available offset of the first segment.

Optionally, the controller 100 may record an allocated segment for each die, for example, may maintain an array of allocated segments or a linked list of allocated segments for each die. Each node in the array of allocated segments or the linked list of allocated segments is used to record basic information about a segment already allocated to the die. Initially, the array of allocated segments or the linked list of allocated segments is null. Therefore, when selecting the first segment, the controller 100 first queries, according to the first die selected in step 401, an array of allocated segments or a linked list of allocated segments that corresponds to the first die, and if a certain segment allocated to the first die exists, further determines whether there is available storage space in the certain segment, for example, may determine whether a value of an available offset recorded in basic information of the certain segment is less than a maximum value (as shown in the foregoing example, the maximum value is 1023). If yes, it indicates that currently there is available storage space in the certain segment, and the certain segment is selected as the first segment, where the determining an available offset is reading the available offset currently recorded in the basic information of the first segment for processing in the subsequent procedure. If it is found by a query that the controller 100 has not allocated any segment to the first die, or that there is no available storage space in each segment allocated to the first die, for example, values of available offsets of all segments allocated to the first die reach the maximum value, it indicates that a new segment needs to be allocated to the first die. For example, the controller 100 may select any blank segment from the foregoing blank segment queue as the first segment. In this case, the available offset of the first segment is a start address of the first segment, that is, the available offset may be 0. A person of ordinary skill in the art may understand that, if the offset of the segment is recorded starting from 1, in this case, the available offset is 1. Then, the basic information about the selected first segment is removed from the blank segment queue and is recorded in the array of allocated segments or the linked list of allocated segments that corresponds to the first die.

Generally, after a segment is allocated to a die, an integer quantity of blocks corresponding to the segment should all come from the die. However, in an actual application to achieve an objective of managing and allocating storage space more flexibly by the storage system, another optional implementation is that a segment may be allocated to multiple dies. In this case, an integer quantity of blocks corresponding to the segment may come from different dies. To achieve the objective of flexible management, as described above, a partial load segment queue may be created. The controller 100 may detect, in real time or periodically, an available offset of each allocated segment recorded in the array of allocated segments or the linked list of allocated segments that is maintained for each die. Usage of storage space of each allocated segment is computed based on the available offset, for example, may be computed using a formula "(Available offset+1)/Quantity of pages included in each block." If a computation result is a positive integer, it indicates that storage space of an integer quantity of blocks is already used currently in the segment. In this case, basic information about the segment may be removed from the array of allocated segments or the linked list of allocated segments, and the basic information about the segment is recorded in the partial load segment queue. In this case, the selecting a first segment and confirming an available offset may be performed according to the following step.

The controller 100 first queries the array of allocated segments or the linked list of allocated segments that corresponds to the first die, and if a segment allocated to the first die exists and there is available storage space in the segment, selects the segment as the first segment. If it is found by a query that the controller 100 has not allocated any segment to the first die or that there is no available storage space in each segment allocated to the first die, the controller 100 may query the partial load segment queue, and if a segment exists in the partial load segment queue, select the segment as the first segment. Further, the basic information about the selected first segment may be removed from the partial load segment queue and recorded in the array of allocated segments or the linked list of allocated segments that corresponds to the first die. Further, if the partial load segment queue is null, any blank segment is selected from the foregoing blank segment queue as the first segment, and then the basic information about the selected first segment is removed from the blank segment queue and recorded in the array of allocated segments or the linked list of allocated segments that corresponds to the first die.

Optionally, the controller 100 may not first query whether there is available space in a segment allocated to the first die, but may first directly select any blank segment from the blank segment queue as the first segment, and then remove the basic information about the selected first segment from the blank segment queue and record the basic information in the array of allocated segments or the linked list of allocated segments that corresponds to the first die. A person skilled in the art may understand that, the following case may occur. All blank segments of the storage system will soon be allocated. In this case, when no blank segment can be allocated, the controller 100 may start a garbage collection mechanism such that valid data in each die is stored in some segments, and that some segments are released as blank segments for subsequent allocation. Another possible implementation is that the segment selection method described in this paragraph and the allocation method described above are combined for use.

A person skilled in the art may understand that, herein, the array or the linked list is only an embodiment. However, in an actual application, various other possible data structures such as a tree may be flexibly used to record basic information about a segment allocated to each die. A data structure is not limited in this embodiment of the present disclosure.

Step 403: The controller generates a write request.

The write request is used to write the data to the solid state disk 200. The controller 100 may generate the write request after selecting the first die and the first segment and determining the available offset. The write request includes a write address, the target data, and the data length.

For content included in the write address, the following two scenarios may exist.

(1) The write address includes an identifier of a channel connected to the first die, an identifier of the first die, an identifier of the first segment, and the available offset.

(2) The write address includes an identifier of the first die, an identifier of the first segment, and the available offset. Referring to the description about the die identifier allocated by the controller 100 described in the foregoing embodiment, if the channel identifier is already included in the die identifier as a part of the die identifier, the write address may be applicable to the scenario (2).

The target data is the data to be written to the solid state disk 200, and the data length is the data length of the target data. As described above, a possible implementation is as follows. After step 402, the controller 100 determines the target data and the data length based on a value of the available offset of the first segment. Further, based on the value of the available offset, current remaining available storage space in the first segment may be determined. In this case, the data length in the write request cannot exceed the remaining available storage space, and the target data is selected based on the determined data length. For example, if the value of the available offset is 1023, it indicates that storage space corresponding to one offset is available in the first segment. As described above, one offset corresponds to a capacity of one page, namely, 16 KB. Therefore, the data length is 16 KB. In this case, the target data should be the foregoing one data block of the 16 KB data length. Likewise, if the value of the available offset is 1022, the data length should be 32 KB, and the target data should be the foregoing two 16 KB data blocks. The rest may be deduced by analogy. An extreme case is that, if the value of the available offset is 0, the data length may be up to 16 KB multiplied by 1024. In this case, the target data may be up to 1024 16 KB data blocks. A person skilled in the art may understand that, when there is enough remaining available space in the segment, that is, when the value of the available offset is still relatively small, the controller 100 may flexibly set the data length in a range of the enough available space. This is not limited herein in this embodiment. The controller 100 may select, as the target data, a corresponding quantity of data blocks from the foregoing multiple 16 KB data blocks that are obtained by performing splitting and/or combining. Herein, it should be especially noted that, if the first die is selected based on the criterion 3 in step 401, when the target data is selected in this step, the target data should be selected from the one or more 16 KB data blocks that are identified as hot data.

Optionally, as described above, the target data and the data length of the target data may also be determined by the controller 100 before the foregoing step 401. In this case, before step 403, the controller 100 may first compare the determined data length of the target data with the available storage space that is in the first segment and is determined based on the available offset of the first segment. If the data length of the target data is less than the available storage space in the first segment, the target data and the data length of the target data are directly included into the write request. If the data length of the target data is greater than the available storage space in the first segment, the controller 100 needs to split the target data into two sub blocks according to the available storage space in the first segment, where a data length of a first sub block is less than or equal to the available storage space in the first segment, and a second sub block is a remaining part other than the first sub block in the target data. In this case, in this step, the controller 100 includes the first sub block that is obtained by splitting and the corresponding data length of the first sub block into the write request as the target data and the data length of the target data respectively, and performs the subsequent procedure. For the second sub block, steps 402 and 403 may be performed repeatedly, or optionally, steps 401, 402, and 403 may be performed repeatedly. For example, if the data length of the target data, confirmed by the controller 100 before step 401, is 64 KB, but the available offset of the first segment selected in step 402 is 1022, it means that the remaining available space in the first segment can store only 32 KB data. In this case, in this embodiment of the present disclosure, the controller 100 may split the 64 KB target data into a first sub block and a second sub block of a 32 KB data length, add the first sub block to the write request, and perform the subsequent procedure. For the second sub block, steps 402 and 403 are performed repeatedly, or optionally, for the second sub block, steps 401, 402, and 403 may be performed repeatedly.

Optionally, after determining the target data, the controller 100 may update the basic information about the first segment based on the target data, including querying whether a host logical block address field in the basic information about the first segment includes the host logical block address of the target data, and if not, also recording the host logical block address of the target data into the host logical block address field in the basic information about the first segment, or if yes, which indicates that the host write request is intended to modify historically stored data, adding 1 to the value of the amount of invalid data in the basic information about the first segment, updating the state of the first segment to "a writing state," and based on the data length of the target data, updating the value of the available offset recorded in the basic information about the first segment. For example, a computation result may be obtained by dividing the data length by a capacity of a page of the solid state disk 200, the computation result is added to the value of the current available offset in the basic information about the first segment, and a updated value of the available offset is obtained, where the updated value of the available offset is used for processing another new write request. Optionally, the solid state disk identifier in the basic information may be recorded as the identifier of the solid state disk 200 to which the first die belongs, the channel identifier may be recorded as the identifier of the channel to which the first die connects, and the die identifier may be recorded as the identifier of the first die. Further, the controller 100 also uses the host logical block address of the target data to query segments other than the first segment and already allocated to each die. If a segment exists in the other allocated segments, and a host logical address recorded in basic information about the segment includes the host logical address of the data to be stored, the host logical address of the target data is deleted from the basic information about the segment, and 1 is added to a value of an amount of invalid data in the basic information about the segment. The action of refreshing the basic information about the first segment may also be performed after step 403.

Step 404: The controller sends the write request.

After generating the write request, the controller 100 sends the write request to the solid state disk 200 to which the first die belongs in order to write the data to the solid state disk 200.

Further, in this embodiment of the present disclosure, the controller 100 may generate a system mapping table in advance. As shown in the following Table 1, each row in the system mapping table may represent a mapping relationship, used to record a mapping relationship between "host logical block address" and "write address of the solid state disk," where the write address of the solid state disk may be indicated by "solid state disk identifier+channel identifier+die identifier+segment identifier+available offset." The system mapping table in an initial state may be null. As shown in the following Table 1, Table 1 is an example of the system mapping table.

TABLE 1

| Host logical block address | Write address of the solid state disk 200 |
|---|---|
| Logical block address 1 | Solid state disk 200 + channel 0 + die 1 + segment 1 + available offset 0 |
| Logical block address 2 | Solid state disk 200 + channel 0 + die 1 + segment 2 + available offset 0 |
| Logical block address 3 | Solid state disk 200 + channel 0 + die 2 + segment 6 + available offset 15 |
| . . . | . . . |

Optionally, when essence of the foregoing mapping relationship is met, a record form of each row includes multiple variable implementations as shown below.

Variable implementation 1: A last bit or multiple bits of the host logical block address correspond to the solid state disk identifier. In this case, information about the solid state disk identifier may not be recorded again in the right column of the foregoing Table 1.

Variable implementation 2: Referring to the foregoing die identifier allocation rule, if the die identifier already uses the channel identifier as a part of the die identifier, information about the channel identifier may not be recorded again in the right column of the foregoing Table 1. Further, if the die identifier already uses the solid state disk identifier and the channel identifier as a part of the die identifier, information about the solid state disk identifier and the channel identifier may not be recorded again in the right column of the foregoing Table 1.

Other variable implementations are not further illustrated one by one in this embodiment. Various variable implementations that meet essence of the foregoing mapping relationship all fall within the protection scope of the embodiments of the present disclosure.

After performing the foregoing step 402, step 403, or step 404, the controller 100 may generate a new mapping relationship for the write operation, and store the new mapping relationship in the system mapping table. In the new mapping relationship, the host logical block address is the host logical block address of the target data carried in the write request, the solid state disk identifier is the identifier of the solid state disk 200 to which the selected first die belongs, the channel identifier is the identifier of the channel connected to the selected first die, the die identifier is the identifier of the selected first die, and the available offset is the recorded available offset of the selected first segment.

Further, in this embodiment of the present disclosure, before or after generating the new mapping relationship, the controller 100 may query the system mapping table based on the host logical block address of the target data carried in the write request. If the controller 100 finds that a mapping relationship associated with the host logical block address of the target data already exists in the system mapping table, it indicates that the write request is intended to modify historically written data. In this case, the existing mapping relationship in the system mapping table is marked with an invalid state. A person skilled in the art may understand that, if the query action is performed after the new mapping relationship is generated, the new mapping relationship should not fall within a query range. The foregoing invalidation action is mainly intended for the existing historical mapping relationship.

It should be noted that, the foregoing Table 1 is only a form for storing the mapping relationship. In an actual application, multiple forms such as an array or a linked list may be used to store the mapping relationship. This is not limited in this embodiment.

In this embodiment of the present disclosure, when there is data to be written to the solid state disk 200, the controller 100 needs to select the first die, and indicating that the target data to be written should be stored in a block included in the first die, and subsequently, the solid state disk 200 needs to allocate a physical storage resource in a range of the first die to store the target data. This avoids a problem that storage resources of the solid state disk 200 cannot be effectively used due to unbalanced data distribution, congestion of some dies, or the like caused because the solid state disk 200 autonomously allocates a physical storage resource to a write request totally based on an internal policy. Further, when selecting the first die, the controller 100 may flexibly use the selection criteria described above, for example, one or more of factors such as a state of a die, a data access frequency, an amount of valid data in a die, a wear degree of a die, and a quantity of read requests to be processed in a die in order to select an optimal die for the data to be written to the solid state disk such that the controller 100 can effectively use the storage space of the solid state disk 200.

Figure 5:
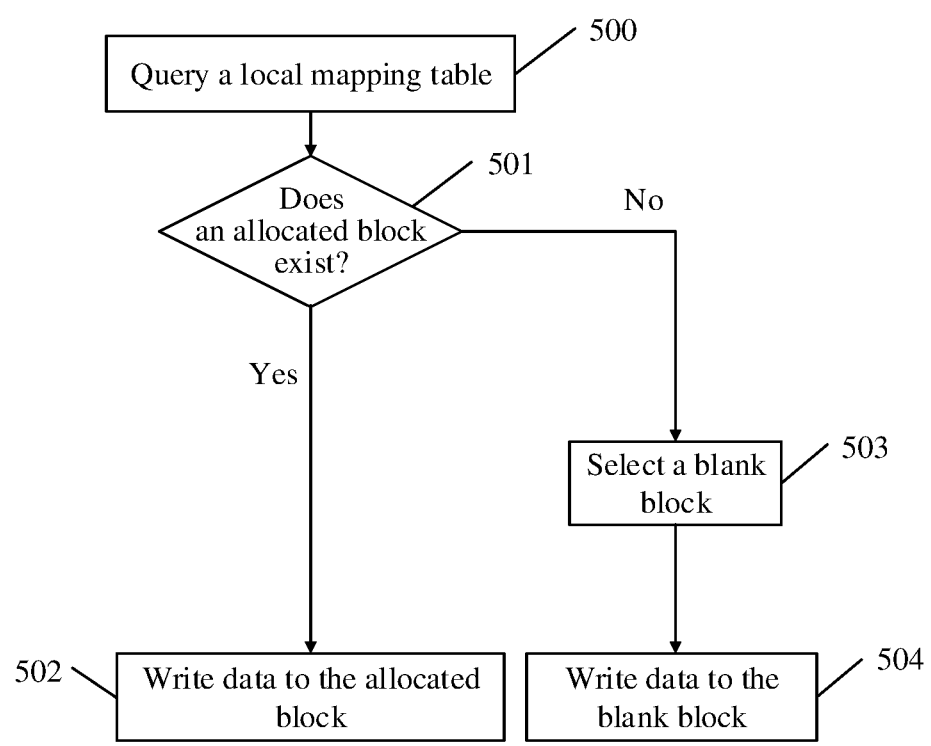
FIG. 5 is a flowchart of a method for processing a write request by a solid state disk according to an embodiment of the present disclosure.

As shown in FIG. 5, FIG. 5 is a processing flowchart after the solid state disk 200 receives the write request. With reference to the schematic structural diagram of the solid state disk 200 shown in FIG. 2, the communications interface 2001 may receive the write request from the controller 100, and the processor 2002 performs subsequent processing, as follows.

Step 500: The solid state disk 200 queries a local mapping table, where the local mapping table is used to record a mapping relationship between "segment" and "physical block address of the solid state disk."

The solid state disk 200 generates the local mapping table in advance. For example, the processor 2002 may run the program instruction to create the local mapping table. The local mapping table may be stored in the memory 2003, or may be stored in a storage medium, and when required for use, read into the memory 2003. The mapping relationship recorded in the local mapping table is used to indicate a mapping relationship between "segment" and "physical block address of the solid state disk." The local mapping table may be null initially. Based on different rules for allocating channel identifiers, die identifiers, and block identifiers by the solid state disk 200, the local mapping table may have multiple implementations.

Implementation 1: As shown in the following Table 2, the physical block address of the solid state disk 200 in the local mapping table may be indicated by a block identifier.

TABLE 2

| Segment | Physical block address of the solid state disk 200 |
| --- | --- |
| Segment 1 | Block 0 |
| Segment 1 | Block 2 |
| Segment 2 | Block 5 |
| . . . | . . . |

Implementation 2: The physical block address of the solid state disk 200 is indicated by "die identifier+block identifier," or indicated by "channel identifier+die identifier+block identifier." Further, which manner is used depends on whether the die identifier includes a channel identifier, as shown in the following Table 3.

TABLE 3

| Segment | Physical block address of the solid state disk 200 |
| --- | --- |
| Segment 1 | Die 1 + block 0 |
| Segment 6 | Die 2 + block 2 |
| Segment 2 | Die 1 + block 5 |
| . . . | . . . |

Further, in the local mapping table, information about an available offset and a page may also be added to the foregoing mapping relationship to form a mapping between "segment+available offset" and "physical block address of the solid state disk." The physical block address of the solid state disk 200 further includes an identifier of the page. As shown in Table 4, the available offset and the identifier of the page are added to the mapping relationship in the foregoing implementation 1.

TABLE 4

| Segment + available offset | Physical block address of the solid state disk 200 |
| --- | --- |
| Segment 1 + available offset 256 | Block 0 + page 256 |
| Segment 1 + available offset 513 | Block 2 + page 1 |
| Segment 2 + available offset 136 | Block 5 + page 136 |
| . . . | . . . |

As shown in the following Table 5, an available offset and an identifier of a page may also be added to the mapping relationship in the foregoing implementation 2.

TABLE 5

| Segment + available offset | Physical block address of the solid state disk 200 |
| --- | --- |
| Segment 1 + available offset 256 | Die 1 + block 0 + page 256 |
| Segment 6 + available offset 626 | Die 2 + block 2 + page 113 |
| Segment 2 + available offset 122 | Die 1 + block 5 + page 122 |
| . . . | . . . |

After the communications interface 2001 of the solid state disk 200 receives a write request from the controller 100, the processor 2002 parses the write request, and queries the local mapping table based on an identifier of a first segment and the available offset that are included in a write address carried in the write request.

In an actual application, when a capacity of each segment corresponds to a capacity of two or more blocks, as shown in the foregoing example in which a capacity of a block is 8 MB, and a capacity of a segment is 16 MB, because 512 pages are included in each block, but an offset of the segment with the 16 MB capacity is 1024, respectively corresponding to 1204 pages, in this case, a local mapping relationship may be stored in a manner of a multi-dimensional array, such as a local mapping table of a multi-dimensional array shown in the following Table 6. In the table, each row is used to record all mapping relationships of a segment. In the table, a physical block address 1 of the solid state disk 200, a physical block address 2 of the solid state disk 200, . . . , a physical block address X of the solid state disk 200 respectively represent a specific physical block address of each of multiple blocks corresponding to the segment, and a value of X is determined based on the capacity of the segment. If the capacity of the segment is twice the capacity of a block, the value of X is set to 2, if the capacity of the segment is five times the capacity of a block, the value of X is set to 5, and the rest may be deduced by analogy. When the table is queried, the processor 2002 first performs a query based on the identifier of the first segment included in the write address in the write request. If none of segment identifiers recorded in the rows in the local mapping table is found to be the same as the identifier of the first segment, it indicates that the solid state disk has not allocated any block to the first segment before the write request is received. If a segment identifier recorded in a row of a mapping relationship in the local mapping table is found to be the same as the identifier of the first segment, further, the processor 2002 computes, based on the available offset included in the write address in the write request, which column of a physical block address of the solid state disk 200 should be queried. For example, computation may be performed according to a formula "X=(Available offset+1)/ Quantity of pages included in each block," where X is rounded up. That is, if $0<X\leq1$, a value of X is 1, if $1<X\leq2$, a value of X is 2, and the rest may be deduced by analogy. As shown in the foregoing example, the quantity of pages included in each block may be 512. In this case, it may be learned that if the available offset is 0 to 511, the column of the physical block address 1 of the solid state disk should be queried, if the available offset is 512 to 1023, the column of the physical block address 2 of the solid state disk should be queried, and the rest may be deduced by analogy. Querying the local mapping table of the multi-dimensional array includes determining whether an identifier of a block is recorded in a cell in which a row corresponding to the identifier of the first segment intersects a column of the physical block address X of the solid state disk that is computed based on the available offset. If yes, it indicates that the processor 2002 of the solid state disk 200 has allocated a block corresponding to the available offset to the first segment. If a query result is null, it indicates that the processor 2002 of the solid state disk 200 has not allocated a block corresponding to the available offset to the first segment.

TABLE 6

| Segment identifier | Physical block address 1 of the solid state disk 200 | Physical block address 2 of the solid state disk 200 | ... | Physical block address X of the solid state disk 200 |
|---|---|---|---|---|
| Segment 1 | Block 0 | Block 0 | | |
| Segment 2 | Block 2 | Block 0 | | Block 0 |
| Segment 3 | Block 5 | | | |
| ... | ... | | | |
| Segment 100 | Block 245 | | | Block 0 |

Optionally, all local mapping relationships of the solid state disk 200 may be managed using local mapping tables on multiple levels. A local mapping table on each level is used to manage a local mapping relationship in which an available offset of a segment corresponds to one block. For example, a first-level local mapping table is used to store a local mapping relationship in which the available offset of the segment is 0 to 511, and a second-level local mapping table is used to store a local mapping relationship in which the available offset of the segment is 512 to 1023. If a capacity of the segment is larger, local mapping tables on more levels are created correspondingly. That the processor 2002 of the solid state disk 200 queries the local mapping table may include, based on the available offset included in the write address in the write request, first determining an Xth-level local mapping table, for example, using the following formula:

X=(Available offset+1)/Quantity of pages included in each block.

X is rounded up. That is, if $0 < X \leq 1$, a value of X is 1, if $1 < X \leq 2$, a value of X is 2, and the rest may be deduced by analogy. As shown in the foregoing example, the quantity of pages included in each block may be 512. In this case, it may be learned that if the available offset is 0 to 511, the available offset corresponds to the first-level local mapping table, if the available offset is 512 to 1023, the available offset corresponds to the second-level local mapping table, and the rest may be deduced by analogy. Then a local mapping table on a corresponding level is queried based on the identifier of the first segment included in the write address in the write request. If a mapping relationship can be found in the local mapping table on the corresponding level, it indicates that the processor 2002 of the solid state disk 200 has allocated a block corresponding to the available offset to the first segment. If no mapping relationship can be found, it indicates that the processor 2002 of the solid state disk 200 has not allocated a block corresponding to the available offset to the first segment.

Step 501: The solid state disk 200 determines whether an allocated block exists.

According to a query result in the foregoing step 500, if it is determined that a block corresponding to the available offset is already allocated to the first segment, step 502 is performed, or if no block corresponding to the available offset is allocated to the first segment, step 503 is performed.

Step 502: The solid state disk 200 writes data to the allocated block.

That the processor 2002 of the solid state disk 200 writes the target data carried in the write request to the allocated block may include, first computing a corresponding page identifier using the available offset. For example, the following formula may be used for computation.

Page identifier=Available offset % Quantity of pages included in each block, where "%" indicates a modulo operation.

The processor 2002 of the solid state disk 200 writes, starting from a page corresponding to the page identifier, the target data carried in the write request to the allocated block.

Step 503: The solid state disk 200 selects a blank block.

Referring to the foregoing description of step 402, if the write address includes an identifier of a channel connected to the first die and an identifier of the first die, the processor 2002 of the solid state disk 200 in this step selects, according to the identifier of the channel connected to the first die and the identifier of the first die, a blank block from multiple blocks included in the first die, or if the write address includes an identifier of the first die, the processor 2002 of the solid state disk 200 selects, according to the identifier of the first die, a blank block from multiple blocks included in the first die. Further, in this embodiment, if the identifier of the first die and the identifier of the channel connected to the first die are reported by the solid state disk 200 to the controller 100, herein, the controller 100 may directly identify the first die according to the identifier of the first die, or according to the identifier of the channel connected to the first die and the identifier of the first die, or if the identifier of the channel connected to the first die and the identifier of the first die are allocated by the controller 100 itself, as described above, the processor 2002 of the solid state disk 200 may convert, according to an identifier allocation rule previously sent by the controller 100, the identifier of the channel connected to the first die and the identifier of the first die that are carried in the second write request into identifiers used by the solid state disk 200 for the channel and the die, and select, based on the identifiers obtained by conversion, a blank block from the multiple blocks included in the first die.

Step 504: The solid state disk 200 writes data to the blank block.

That the processor 2002 of the solid state disk 200 writes the target data carried in the write request to the blank block may include, first computing a corresponding page using the available offset. For example, the following formula may be used for computation.

Page identifier=Available offset % Quantity of pages included in each block, where "%" indicates a modulo operation.

The processor 2002 of the solid state disk 200 writes, starting from a page corresponding to the page identifier, the data carried in the write request to the blank block.

Further, the processor 2002 of the solid state disk 200 generates a new mapping relationship. If the local mapping table indicates a mapping between "segment" and "physical block address of the solid state disk" as described above, after step 503 or step 504, the processor 2002 may generate a new mapping relationship based on the identifier of the first segment and an identifier of the selected blank block, and store the new mapping relationship in the local mapping table. If the local mapping table indicates a mapping between "segment+available offset" and "physical block address of the solid state disk" as described above, after step 502, the processor 2002 may generate a new mapping relationship based on the identifier of the first segment, the available offset, an identifier of the allocated block, and the page identifier corresponding to the available offset, and store the new mapping relationship in the local mapping table, or after step 503 or step 504, the processor 2002 generates a new mapping relationship based on the identifier of the first segment, the available offset, an identifier of the blank block, and the page identifier corresponding to the available offset, and stores the new mapping relationship in the local mapping table.

Optionally, after the communications interface 2001 of the solid state disk 200 receives the write request from the controller 100, the processor 2002 may first cache the data carried in the write request into the memory 2003, and then may send a write success message to the controller 100, or may send a write success message (not shown) to the controller 100 after step 503 or step 505.

In this embodiment of the present disclosure, the solid state disk 200 writes the target data in the write request to the block included in the die specified by the controller 100. This avoids a problem that storage resources of a solid state disk cannot be effectively used due to unbalanced data distribution, congestion of some dies, or the like caused because the solid state disk autonomously allocates a physical storage resource to a write request totally based on an internal policy.

Figure 6:
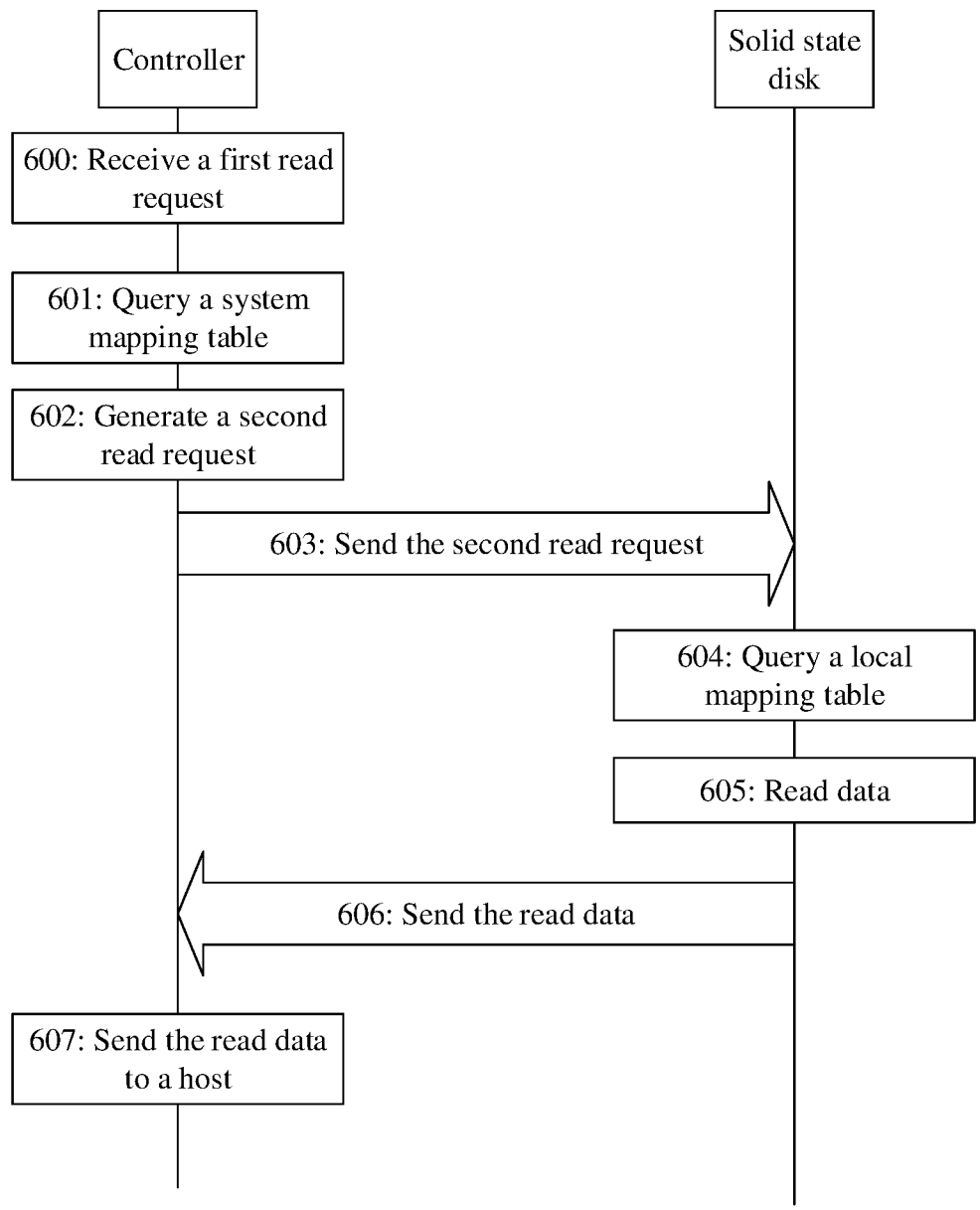
FIG. 6 is a flowchart of a method for processing a read request in a storage system according to an embodiment of the present disclosure.

As shown in FIG. 6, FIG. 6 is a flowchart of a method for processing a read request in the storage system according to an embodiment of the present disclosure.

Step 600: A controller receives a first read request.

With respect to FIGS. 1 and 2, the controller 100 receives the first read request from a host. The first read request carries a host logical block address and a data length. Herein, the host logical block address indicates a start address of to-be-read data, and the data length is used to indicate a length of the to-be-read data.

Step 601: The controller queries a system mapping table.

The controller 100 queries the system mapping table based on the host logical block address carried in the first read request. If a mapping relationship corresponding to the host logical block address can be found, it indicates that the to-be-read data is already stored in the storage system, and subsequent processing is continued, otherwise, it indicates that the to-be-read data is not stored in the storage system, and the controller 100 may return a read failure message (not shown) to the host.

Step 602: The controller generates a second read request.

The controller 100 generates the second read request. The second read request includes a read address and a data length. The data length is the data length carried in the first read request, and the read address is generated based on the mapping relationship found from the system mapping table. As described in the foregoing embodiment, the mapping relationship is used to record a mapping between "host logical block address" and "solid state disk identifier+ channel identifier+die identifier+segment identifier+available offset." In this case, after the controller 100 finds, based on the host logical block address carried in the first read request, the mapping relationship associated with the host logical block address, the controller 100 generates the read address based on the mapping relationship. Optionally, the read address may include a channel identifier, a die identifier, a segment identifier, and an available offset that are recorded in the mapping relationship corresponding to the host block logical address. Optionally, in multiple possible implementations of the system mapping table as described in the foregoing embodiment, the read address may also not include a channel identifier because a die identifier possibly already uses the channel identifier as a part of the die identifier. That is, in this case, the read address may include the die identifier, the segment identifier, and the available offset that are recorded in the mapping relationship corresponding to the host logical address.

Step 603: The controller sends the second read request to a solid state disk.

After generating the second read request, the controller 100 sends, based on the solid state disk identifier included in the found mapping relationship, the second read request to the solid state disk 200 corresponding to the solid state disk identifier.

Step 604: The solid state disk queries a local mapping table.

After the communications interface 2001 of the solid state disk 200 receives the second read request, the processor 2002 of the solid state disk 200 reads data based on the read address and the data length that are carried in the second read request. Herein, the local mapping table is first queried according to the segment identifier carried in the read address. If no mapping relationship is found in the local mapping table, the processor 2002 of the solid state disk 200 may return a read failure message (not shown) to the controller 100 using the communications interface 2001, and the procedure ends.

Step 605: The solid state disk reads data.

The processor 2002 of the solid state disk 200 reads data based on the die identifier carried in the read address in the second read request and a physical address of the solid state disk 200 included in the mapping relationship found from the local mapping table in step 604, or reads data based on the channel identifier and the die identifier carried in the read address in the second read request and a physical address of the solid state disk 200 included in the mapping relationship found from the local mapping table in step 604.

Optionally, in an actual application, the data may fail to be read in this step due to damage of some blocks or pages of the solid state disk 200 or the like. If this case occurs, the processor 2002 of the solid state disk 200 may return a read failure message (not shown) to the controller 100 using the communications interface 2001, and the procedure ends.

Step 606: The solid state disk sends the read data to the controller.

After reading the data, the processor 2002 of the solid state disk 200 sends the read data to the controller 100 using the communications interface 2001.

Step 607: The controller sends the read data to a host.

After receiving the read data sent by the solid state disk 200, the controller 100 sends the read data to the host. Up to now, processing of the read request is completed.

In the foregoing embodiment, when the controller 100 creates a segment, there is no relationship between the newly created segment and the solid state disk 200, a channel, and a die. An association relationship between a first die and a first segment is established only after the first die is selected and the first segment is selected. In another optional implementation provided by this embodiment of the present disclosure, when creating a segment, the controller 100 establishes an association relationship between the segment and the solid state disk 200, a channel, and a die using a segment identifier allocated to the segment. For example, when allocating a segment identifier to each segment, the controller 100 may establish an association relationship between the segment and a die. Further, there may be multiple implementations. Optionally, for example, the segment identifier may include three parts, channel identifier+ die identifier+segment identifier to indicate that storage space in the segment should come from a block in a die corresponding to the channel identifier and the die identifier. Optionally, a mapping relationship between the segment identifier and the channel identifier and the die identifier may also be established using an algorithm, for example, a hash algorithm: Channel identifier=Segment identifier % Quantity of channels. As shown in the foregoing example, the quantity of channels may be 16, die identifier=(Segment identifier % Quantity of channels) % Quantity of dies in each channel. As shown in the foregoing example, the quantity of dies in each channel may be 8, and in this case, the controller 100 may determine an identifier of each segment based on the foregoing hash algorithm. After creating the segment, the controller 100 configures the segment identifier in basic information about the segment based on the foregoing rule. For configurations of other items in the basic information about the segment, refer to the description of the foregoing embodiment. Details are not further described herein. In this embodiment, after each segment is created and allocated the segment identifier, an association relationship between the segment and the die is established. In this case, the segment may be directly recorded in an array or a linked list of the die associated with the segment, where each node in the array or the linked list is used to record basic information about the segment associated with the die.

Based on the foregoing segment, an embodiment of the present disclosure provides another method for processing a write request in the storage system. In this method, the step of selecting a first die by the controller 100 is the same as step 400 in the foregoing embodiment, and is not further described herein. The controller 100 selects a first segment and determines an available offset. Herein, the controller 100 selects, based on an identifier of the selected first die, the first segment from multiple segments associated with the first die. For a selection rule, refer to FIG. 4 and the description of step 401 in the foregoing embodiment. Details are not further described herein. Then, the controller 100 generates a write request, where the write request includes a write address, target data, and a data length of the target data. Optionally, referring to FIG. 4 and the description of step 403, settings of the write address herein may be the same as those in step 403. In this way, subsequent processing steps are totally the same as those in FIG. 4, step 403, and FIG. 5 and corresponding embodiments. Details are not further described herein. Optionally, because a segment identifier already includes information about a channel identifier and a die identifier in this embodiment, the write address needs to include only the segment identifier and the available offset, and may not need to include the information about the channel identifier and the die identifier again. Then, the controller 100 sends the write request to a solid state disk 200. In this embodiment, the controller 100 maintains and updates a system mapping table. Optionally, settings of the system mapping table may be the same as the setting described in the embodiment in FIG. 4. Optionally, because the segment identifier already includes the information about the channel identifier and the die identifier, only the segment identifier and the available offset may be recorded in column of the write address of the solid state disk in each mapping relationship in the system mapping table.

Processing after the solid state disk 200 receives the write request is basically the same as that in FIG. 5 and the description of the corresponding embodiment. A difference lies only in that when performing step 503 to select a blank block, the solid state disk 200 needs to parse the segment identifier included in the write address in the write request to obtain the channel identifier and the die identifier, and select, according to the channel identifier and the die identifier that are obtained by parsing, a blank block from multiple blocks included in the corresponding first die.

Further, an embodiment of the present disclosure further provides another method for processing a read request in the storage system. The method is basically the same as that in FIG. 6 and the description of the corresponding embodiment. A difference lies only in that when a second read request is generated in step 602, a read address in the second read request may need to include only a segment identifier and an available offset.

In this embodiment of the present disclosure, when there is data to be written to the solid state disk 200, the controller 100 selects the first die, and selects, based on the first die, the segment associated with the first die, where the segment identifier of the segment implicitly carries the die identifier and the channel identifier, indicating that the target data to be written should be stored in a block included in the first die. This avoids a problem that storage resources of the solid state disk cannot be effectively used due to unbalanced data distribution, congestion of some dies, or the like caused because the solid state disk autonomously allocates a physical storage resource to a write request totally based on an internal policy. Further, when selecting the first die, the controller 100 may flexibly use a selection policy, for example, one or more of factors such as a state of a die, a data access frequency, an amount of valid data in a die, a wear degree of a die, and a quantity of read requests to be processed in a die in order to select an optimal die for the data to be written to the solid state disk 200 such that the controller 100 can effectively use the storage space of the solid state disk 200.

Figure 7:
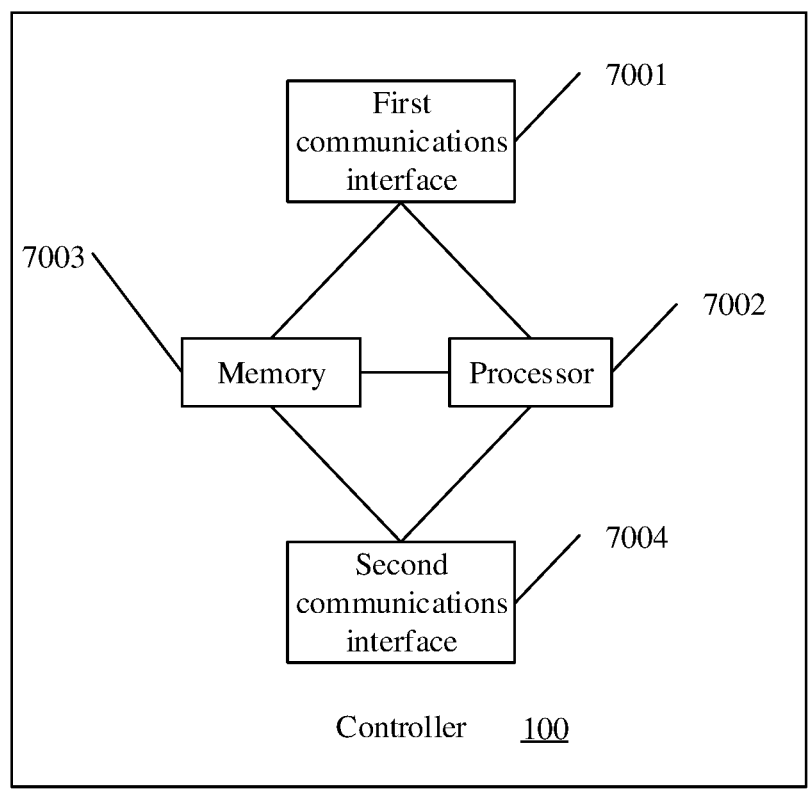
FIG. 7 is a structural diagram of a controller according to an embodiment of the present disclosure.

FIG. 7 is an example structural diagram of a controller 100. The controller 100 includes a first communications interface 7001, a processor 7002, a memory 7003, and a second communications interface 7004.

The first communications interface 7001 is configured to communicate with a host. The controller 100 may receive an operation instruction of the host such as a host read request or a host write request using the first communications interface 7001, and hand over the operation instruction to the processor 7002 for processing. The first communications interface 7001 is further configured to send a message such as a write success message, a write failure message, a read failure message, or read data to the host. The first communications interface 7001 may be a host bus adapter (HBA) card.

The processor 7002 may be a CPU, or an ASIC, or is configured as one or more integrated circuits for implementing this embodiment of the present disclosure.

The memory 7003 may be configured to cache data carried in the host write request received by the first communications interface 7001 from the host, or cache data read from a solid state disk. The memory 7003 may be a volatile memory, a non-volatile memory, or a combination thereof. The volatile memory may be, for example, a RAM. The non-volatile memory may be a machine readable medium that can store program code or data, such as a floppy disk, a hard disk, a solid state disk, or an optical disc. The memory 7003 may have a power failure protection function. The power failure protection function means that data stored in the memory 7003 is not lost even if a system encounters a power failure and is powered on again.

The memory 7003 may further store a program instruction. The processor 7002 is configured to execute the program instruction to complete various processing actions of the controller 100. For details, refer to all the foregoing processing actions in FIG. 3 to FIG. 6 and corresponding embodiments. Details are not further described in this apparatus embodiment. Optionally, after generating a system mapping table, the processor 7002 may also store the system mapping table in the memory 7003.

The second communications interface 7004 is configured to communicate with the solid state disk. Using the second communications interface 7004, the processor 7002 of the controller 100 may send an operation instruction such as a write request or a read request to the solid state disk, and receive various messages from the solid state disk.

Figure 8:
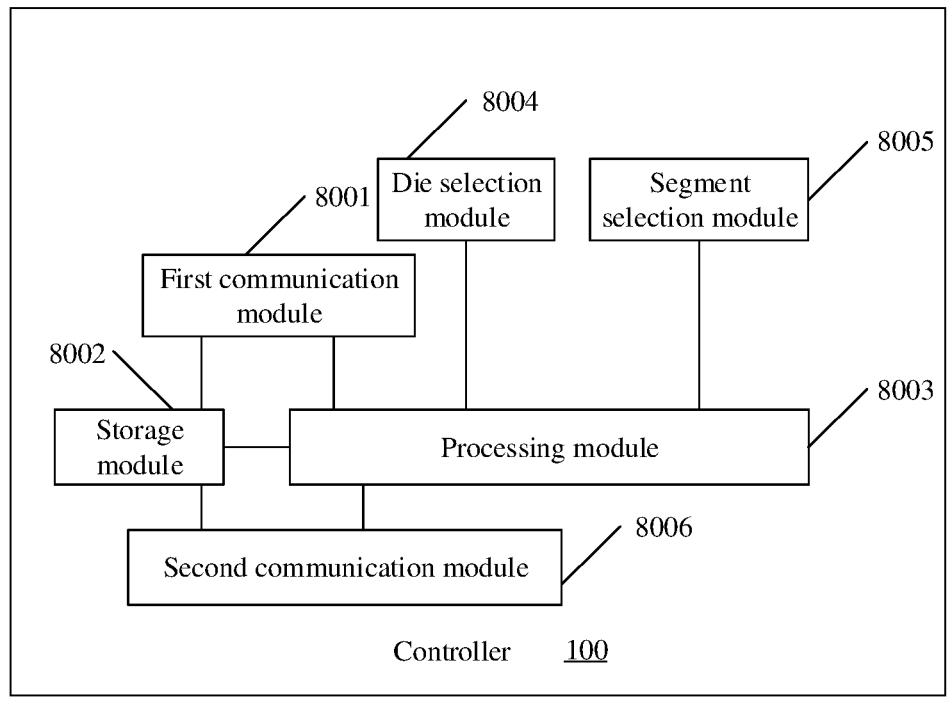
FIG. 8 is a logical structural diagram of another controller according to an embodiment of the present disclosure.

As shown in FIG. 8, FIG. 8 is a schematic logical structural diagram of a controller 100 according to an embodiment of the present disclosure. The controller 100 includes a first communication module 8001, a storage module 8002, a processing module 8003, a die selection module 8004, a segment selection module 8005, and a second communication module 8006.

The first communication module 8001 is configured to communicate with a host, and receive an operation instruction of the host, such as a host read request or a host write request, and is further configured to send a message such as a write success message, a write failure message, a read failure message, or read data to the host.

The storage module 8002 may be configured to cache data carried in the host write request received by the first communication module 8001 from the host.

The processing module 8003 may be configured to perform a splitting and/or combining operation on the cached data to generate unit-length (such as 16 KB) data blocks and a host logical block address of each data block, may be configured to determine target data to be written to a solid state disk and a data length of the target data, and may be further configured to create multiple segments, and store basic information about the multiple created segments in the storage module 8002. For a specific implementation of a specific storage manner, refer to FIG. 4 and the description of the embodiment.

The die selection module 8004 is configured to select a first die. For a specific implementation, refer to FIG. 4 and the detailed description of step 400.

The segment selection module 8005 is configured to select a first segment and determine an available offset. For a specific implementation, refer to FIG. 4 and the detailed description of step 401, or the foregoing description of another method for processing a write request in the storage system.

The processing module 8003 is further configured to generate a write request according to the first die selected by the die selection module 8004, and the first segment selected and the available offset determined by the segment selection module 8005. Optionally, the processing module 8003 is further configured to determine the target data and the data length of the target data according to a value of the available offset of the first segment, and generate the write request based on the target data and the data length of the target data, and further configured to generate a system mapping table, and update the system mapping table in real time. For a specific implementation, refer to FIG. 4 and the detailed description of step 402, or the foregoing description of another method for processing a write request in the storage system.

The storage module 8002 may be further configured to store the system mapping table.

The second communication module 8006 is configured to communicate with the solid state disk. Using the second communication module 8006, the processing module 8003 may send various operation commands such as a write request and a read request to the solid state disk, and receive various messages from the solid state disk. The storage module 8002 may be further configured to cache data carried in various messages received by the second communication module 8006 from the solid state disk.

The processing module 8003 is further configured to query the system mapping table according to the read request received by the first communication module 8001 from the host, generate a second read request, and send the second read request to the solid state disk using the second communication module 8006. The second communication module 8006 receives read data returned by the solid state disk. The storage module 8002 is further configured to cache the read data. The processing module 8003 is further configured to send the read data to the host using the first communication module 8001, as described in FIG. 6 and the embodiment, or as described in the foregoing embodiment of another method for processing a read request in the storage system.

Figure 9:
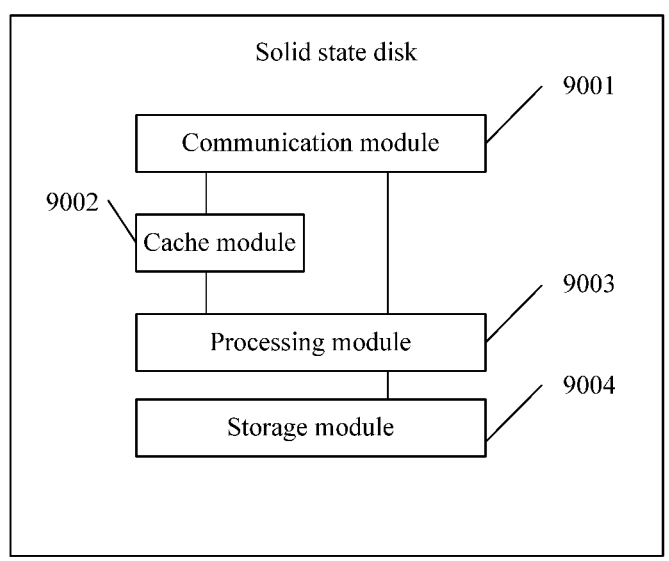
FIG. 9 is a logical structural diagram of another solid state disk according to an embodiment of the present disclosure.

As shown in FIG. 9, FIG. 9 is a schematic logical structural diagram of a solid state disk according to an embodiment of the present disclosure. The solid state disk includes a communication module 9001, a cache module 9002, a processing module 9003, and a storage module 9004.

The communication module 9001 is configured to communicate with a controller, and receive a message such as a write request, a read request, or another instruction from the controller, and further configured to send a message such as a write success message, a write failure message, a read success message, or a read failure message to the controller.

The cache module 9002 is configured to cache data carried in the message received by the communication module 9001 from the controller.

The processing module 9003 is configured to generate a local mapping table, as described in FIG. 5 and step 500 in the embodiment, where the local mapping table may be stored in the cache module 9002, or may be stored in the storage module 9004, and when required for use, read by the processing module 9003 and cached in the cache module 9002, and further configured to process the write request received by the communication module 9001, query the local mapping table, and if it is found by a query that a block is allocated, write data carried in the write request to the corresponding block of the storage module 9004, as described in FIG. 5 and steps 500 to 502 in the embodiment, if it is found by a query that no block is allocated, select a blank block in the storage module 9004, and write data carried in the write request to the blank block of the storage module 9004, as described in FIG. 5 and steps 500, 501, 503, and 504 of the embodiment, or as described in the foregoing embodiment of another method for processing a write request in the storage system.

The processing module 9003 is further configured to generate a new mapping relationship and store the new mapping relationship in the local mapping table, as described in FIG. 5 and the embodiment.

The processing module 9003 is further configured to query the local mapping table according to the read request received by the communication module 9001, read data from the storage module 9004 based on a query result, and send the read data to a host using the communication module 9001, as described in FIG. 6 and the embodiment.

A person of ordinary skill in the art may understand that, each aspect of the embodiments of the present disclosure or a possible implementation of each aspect may be implemented as a system, a method, or a computer program product. Therefore, each aspect of the present disclosure or a possible implementation of each aspect may use forms of hardware only embodiments, software only embodiments (including firmware, resident software, and the like), or embodiments with a combination of software and hardware, which are uniformly referred to as "circuit," "module," or "system" herein. In addition, each aspect of the embodiments of the present disclosure or the possible implementation of each aspect may take a form of a computer program product. The computer program product is computer-readable program code stored in a computer-readable medium.

The computer-readable storage medium includes but is not limited to an electronic, magnetic, optical, electromagnetic, infrared, or semi-conductive system, device, or apparatus, or any appropriate combination thereof, such as a RAM, a ROM, an erasable programmable ROM (EPROM), and an optical disc.

A processor in a computer reads the computer-readable program code stored in the computer-readable medium such that the processor can execute each step in the flowchart or function actions specified in a combination of steps.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A storage system, comprising:
a solid state disk comprising a plurality of channels, wherein each one of the channels is coupled to a plurality of dies;
a memory comprising a selection policy; and
a controller capable of communicating with the solid state disk and the memory, wherein the controller is configured to:
create a plurality of segments;
select a first die from the dies based on the selection policy that is retrieved from the memory;
select a first segment from the segments;
determine an available offset of the first segment;
generate a write request comprising a write address, target data, and a data length of the target data, wherein the write address comprises an identifier of a channel coupled to the first die, an identifier of the first die, an identifier of the first segment, and the available offset; and
send the write request to the solid state disk, and
wherein the solid state disk is configured to:
receive the write request;
store the target data according to the write address and the data length of the target data;
query a local mapping table according to the identifier of the first segment and the available offset comprised in the write address, wherein the local mapping table is configured to store a mapping relationship between a segment and a physical block address of the solid state disk;
determine a page identifier according to the available offset comprised in the write address, and write, based on the data length of the target data and starting from a page corresponding to the page identifier, the target data into a block corresponding to the first segment when the block corresponding to the first segment is recorded in the local mapping table; and
select a blank block from a plurality of blocks of the first die based on the identifier of the channel coupled to the first die and the identifier of the first die, determine the page identifier according to the available offset comprised in the write address, and write, based on the data length of the target data and starting from the page corresponding to the page identifier, the target data into the blank block when the block corresponding to the first segment is not recorded in the local mapping table.

2. The storage system of claim 1, wherein the controller is further configured to:
record states of the dies; and
select a stateless die from the dies as the first die.

3. The storage system of claim 1, wherein the controller is further configured to:
determine an access frequency of the target data based on a host logical block address of the target data; and
select a die in which an amount of stored data, whose access frequency is greater than an access frequency threshold, is less than a first threshold as the first die when the access frequency of the target data is greater than the access frequency threshold.

4. The storage system of claim 1, wherein the controller is further configured to:
record an amount of valid data stored in each of the dies; and
select a die in which an amount of valid data is less than a second threshold as the first die.

5. The storage system of claim 1, wherein the controller is further configured to:
record a wear degree of each of the dies; and
select a die whose wear degree is less than a wear degree threshold as the first die.

6. The storage system of claim 1, wherein the controller is further configured to:
record a quantity of read requests to be processed in each of the dies; and
select a die in which a quantity of read requests to be processed is less than a third threshold as the first die.

7. The storage system of claim 1, wherein the controller is further configured to select a certain segment as the first segment when the certain segment is already allocated to the first die and has available storage space.

8. The storage system of claim 1, wherein the controller is further configured to:
generate a mapping relationship configured to record a mapping between a host logical block address of the target data and the channel coupled to the first die, the first die, the first segment, and the available offset; and
store the mapping relationship in a system mapping table.

9. The storage system of claim 1, wherein the solid state disk is further configured to:
generate a new mapping relationship configured to record a mapping between the first segment and the blank block; and
store the new mapping relationship in the local mapping table.

10. The storage system of claim 1, wherein the selection policy comprises selecting the first die based on a state of the first die.

11. The storage system of claim 1, wherein the selection policy comprises selecting the first die based on a data access frequency.

12. The storage system of claim 1, wherein the selection policy comprises selecting the first die based on an amount of valid data in the first die.

13. The storage system of claim 1, wherein the selection policy comprises selecting the first die based on a wear degree of the first die.

14. The storage system of claim 1, wherein the selection policy comprises selecting the first die based on a quantity of read requests to be processed in the first die.

15. The storage system of claim 1, wherein the selection policy comprises selecting the first die based on a combination of selecting the first die based on a state of the first die, selecting the first die based on a data access frequency, selecting the first die based on an amount of valid data in the first die, selecting the first die based on a wear degree of the first die, and selecting the first die based on a quantity of read requests to be processed in the first die.

16. The storage system of claim 1, wherein the controller is further configured to select a blank segment from the segments as the first segment.

17. A solid state disk, comprising:
a processor;
a memory coupled to the processor;
a communications interface coupled to the processor; and
a plurality of channels,
wherein the processor and the memory are respectively coupled to a plurality of dies via each of the channels,
wherein each of the dies comprises a plurality of blocks,
wherein the processor, the memory, and the communications interface are capable of communicating with each other,
wherein the communications interface is configured to receive a write request comprising a write address, target data, and a data length of the target data,
wherein the write address comprises an identifier of a first die, an identifier of a channel coupled to the first die, an identifier of a first segment, and an available offset,
wherein the memory is configured to store a local mapping table configured to record a mapping relationship between a segment and a physical block address of the solid state disk, and
wherein the processor is configured to:
query the local mapping table according to the identifier of the first segment and the available offset comprised in the write address;
determine a page identifier according to the available offset, and write, based on the data length of the target data and starting from a page corresponding to the page identifier, the target data into a block corresponding to the first segment when the block corresponding to the first segment is recorded in the local mapping table; and
select a blank block from a plurality of blocks of the first die based on the identifier of the channel coupled to the first die and the identifier of the first die, determine the page identifier according to the available offset comprised in the write address, and write, based on the data length of the target data and starting from the page corresponding to the page identifier, the target data into the blank block when the block corresponding to the first segment is not recorded in the local mapping table.

18. The solid state disk of claim 17, wherein the processor is further configured to:
generate a new mapping relationship configured to record a mapping between the first segment and the blank block; and
store the new mapping relationship in the local mapping table.

19. A solid state disk, comprising:
a processor;
a memory coupled to the processor;
a communications interface coupled to the processor; and
a plurality of channels,
wherein the processor and the memory are respectively coupled to a plurality of dies via each of the channels,
wherein each of the dies comprises a plurality of blocks,
wherein the processor, the memory, and the communications interface are capable of communicating with each other,
wherein the communications interface is configured to receive a write request comprising a write address, target data, and a data length of the target data,
wherein the write address comprises an identifier of a first segment and an available offset,
wherein the identifier of the first segment carries an identifier of a first die and an identifier of a channel coupled to the first die,
wherein the memory is configured to store a local mapping table configured to record a mapping relationship between a segment and a physical block address of the solid state disk, and
wherein the processor is configured to:
query the local mapping table according to the identifier of the first segment and the available offset comprised in the write address;
determine a page identifier according to the available offset, and write, based on the data length of the target data and starting from a page corresponding to the page identifier, the target data into a block corresponding to the first segment when the block corresponding to the first segment is recorded in the local mapping table; and
parse the identifier of the first segment to obtain the identifier of the first die and the identifier of the channel coupled to the first die, select a blank block from a plurality of blocks of the first die based on the identifier of the channel coupled to the first die and the identifier of the first die, determine the page identifier according to the available offset comprised in the write address, and write, based on the data length of the target data and starting from the page corresponding to the page identifier, the target data into the blank block when the block corresponding to the first segment is not recorded in the local mapping table.

20. The solid state disk of claim 19, wherein the processor is further configured to:
generate a new mapping relationship configured to record a mapping between the first segment and the blank block; and
store the new mapping relationship in the local mapping table.

* * * * *